(12) United States Patent
 Mizobuchi et al.

(10) Patent No.: US 9,135,351 B2
(45) Date of Patent: Sep. 15, 2015

(54) DATA PROCESSING METHOD AND DISTRIBUTED PROCESSING SYSTEM

(71) Applicant: FUJITSU LIMITED, Kawasaki-shi (JP)

(72) Inventors: Yuji Mizobuchi, Kawasaki (JP); Tomohiro Ohtake, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 231 days.

(21) Appl. No.: 13/717,997

(22) Filed: Dec. 18, 2012

(65) Prior Publication Data

US 2013/0179466 A1    Jul. 11, 2013

(30) Foreign Application Priority Data

Jan. 5, 2012 (JP) .................................. 2012-000598

(51) Int. Cl.
G06F 17/30 (2006.01)

(52) U.S. Cl.
CPC .... *G06F 17/30867* (2013.01); *G06F 17/30457* (2013.01); *G06F 17/30545* (2013.01); *G06F 17/30864* (2013.01); *G06F 17/30067* (2013.01)

(58) Field of Classification Search
CPC ............ G06F 17/30864; G06F 17/30247; G06F 17/30265; G06F 17/30696; G06F 17/30646; G06F 17/30693; G06F 17/30867; G06F 17/28; G06F 17/30011; G06F 17/3033; G06F 17/30477; G06F 17/3053; G06F 17/30554; G06F 17/30595; G06F 17/30598; G06F 17/30657; G06F 17/30873
USPC .......................................... 707/722, 758, 770
See application file for complete search history.

(56) References Cited

U.S. PATENT DOCUMENTS

| 8,135,698 B2 * | 3/2012 | Dettinger et al. ............. 707/708 |
| 2005/0240570 A1 | 10/2005 | Ozbutun |
| 2010/0076975 A1 * | 3/2010 | Futatsugi ....................... 707/736 |
| 2012/0053446 A1 * | 3/2012 | Lossev et al. .................. 600/407 |
| 2012/0221553 A1 * | 8/2012 | Wittmer et al. ............... 707/722 |

FOREIGN PATENT DOCUMENTS

| JP | 2002-259443 A | 9/2002 |
| JP | 2010-09222 | 4/2010 |

OTHER PUBLICATIONS

Japanese Office Action mailed Jun. 2, 2015 for corresponding Japanese Patent Application No. 2012-000598, with Partial English Translation, 6 pages.

* cited by examiner

*Primary Examiner* — Pierre Vital
*Assistant Examiner* — Andalib Lodhi
(74) *Attorney, Agent, or Firm* — Fujitsu Patent Center

(57) ABSTRACT

In a data processing method, a storage apparatus stores one or more results of a second process, corresponding to input data sets processed in the past. When a first input data set is designated, a search unit searches the storage apparatus for a result of the second process, corresponding to a second input data set having an overlapping part with the first input data set. A data processing unit acquires a result of the first process, corresponding to differential input data that is included in the second input data set but not included in the first input data set, and generates a result of the second process, corresponding to the first input data set, by removing the effect of the differential input data from the result of the second process found as a result of the search, using the acquired result of the first process.

6 Claims, 30 Drawing Sheets

FIG. 8

| Reduce Result Table ||
|---|---|
| Inpu Data Identifier | Reduce Result |
| 2011/04/30-2011/05/04-Reduce | <apple,22><br><orange,14><br>... |
| 2011/05/01-2011/05/05-Reduce | <apple,19><br><orange,12><br>... |
| ... | ... |

611

FIG. 14A  CODE EXAMPLE FOR REDUCE PROCESS

```
package sample;
import java.io.IOException;
import java.util.Iterator;
...

public class WordCount_Reduce extends MapReduceBase
implements Reducer<Text, IntWritable, Text, IntWritable> {
    @Override
    public void reduce(Text key, Iterator<IntWritable> values,
        OutputCollector<Text, IntWritable> output, Reporter reporter)
    throws IOException {
        int sum = 0;
        while (values.hasNext()) {
            sum = sum + values.next().get();
        }
        output.collect(key, new IntWritable(sum));
    }
}
```

FIG. 14B  CODE EXAMPLE FOR REVERSE REDUCE PROCESS

```
package sample;
import java.io.IOException;
import java.util.Iterator;
...

public class WordCount_Reverse_Reduce extends MapReduceBase
implements Reducer<Text, IntWritable, Text, IntWritable> {
    private int sum = 0;
    @Override
    public void wordcount_reduce(Text key, Iterator<IntWritable> values,
        OutputCollector<Text, IntWritable> output, Reporter reporter)
    throws IOException {
        while (values.hasNext()) {
            sum = sum - values.next().get();
        }
        output.collect(key, new IntWritable(sum));
    }
    public setSum(int initSum){
        this.sum = initSum;
    }
}
```

FIG. 15

| Map Result Table ||
|---|---|
| Map Result Identifier | Map Result |
| 2011/04/30~Map | <apple,4><br><orange,1><br>... |
| 2011/05/01~Map | <apple,3><br><orange,2><br>... |
| ... | ... |

| | | Rating Value Table | | | |
|---|---|---|---|---|---|
| Date | Product ID | Rating Value | | | |
| | | Taro | Jiro | Kenji | Satoshi |
| ... | ... | ... | ... | ... | ... |
| 2011/3/1 | Item1 | 1 | — | — | — |
| 2011/3/1 | Item2 | — | 2 | — | — |
| 2011/3/1 | Item3 | — | — | 3 | — |
| 2011/3/1 | Item4 | — | — | — | 5 |
| 2011/3/2 | Item1 | — | 4 | — | — |
| 2011/3/2 | Item2 | — | — | 4 | — |
| 2011/3/3 | Item1 | — | — | 2 | — |
| 2011/3/3 | Item2 | — | — | — | 4 |
| 2011/3/4 | Item1 | — | — | — | 2 |
| 2011/3/4 | Item5 | 4 | — | — | — |
| 2011/3/4 | Item6 | — | 2 | 5 | — |
| 2011/3/5 | Item2 | 5 | — | — | — |
| 2011/3/5 | Item4 | 2 | 5 | — | — |
| 2011/3/5 | Item5 | — | 1 | — | 1 |
| 2011/3/6 | Item1 | 5 | — | — | — |
| 2011/3/6 | Item3 | — | — | 5 | — |
| ... | ... | ... | ... | ... | ... |

| Reduce Result Table ||
|---|---|
| Input Data Identifier | Reduce Result |
| ... | ... |
| 2011/03/01-<br>2011/03/05-<br>Reduce | (Item1,(Taro-3/1-1,Jiro-3/2-4,Kenji-3/3-2,Satoshi-3/4-2))<br>(Item2,(Jiro-3/1-2,Kenji-3/2-4,Satoshi-3/3-4,Taro-3/5-5))<br>(Item3,(Kenji-3/1-3))<br>(Item4,(Taro-3/5-2,Jiro-3/5-5,Satoshi-3/1-5))<br>(Item5,(Satoshi-3/5-1,Jiro-3/5-1,Taro-3/4-4))<br>(Item6,(Kenji-3/4-5,Jiro-3/4-2)) |
| ... | ... |

CODE EXAMPLE OF REVERSE REDUCE PROCESS

```
//Pseudo Code of Reverse Reduce Process in Phase 1
public class CollaborativeFiltering_phase1_Reverse_Reduce implements
    Reducer<Text, ArrayWritable, Text, MapWritable> {

//Extract Previous Reduce Results of Period from March 1, 2011 to March 5, 2011
    //Example of Reduce Result:(Taro-3/1-1, Jiro-3/2-4, Kenji-3/3-2, Satoshi-3/4-2)
    public List<String> init(Text key){···}

//key:Product ID, values:List of Ratings of Individual Users And Rating Dates (Example:((kenji-
3/1-4),(Taro-3/2-3)))
protected void reduce(Text key, Iterable<Text> values, Context context)
    throws IOException, InterruptedException {
    //Data Example of List:(Taro-3/1-1, Jiro-3/2-4, Kenji-3/3-2, Satoshi-3/4-2)
    List<String> list = init(key);

//Delete Rating of Each User With Respect to Each Element of Map Result
    //Example of Map Result:(Taro-3/1-1)
    for (Text value : values) {
    //Divide Character String Using "-"
    StringTokenizer tokenizer = new StringTokenizer(value.toString(), "-");
    // Acquire User Name, Date, And Rating Value. Create Date Object
    String name = tokenizer.nextToken();
    String date = tokenizer.nextToken();
    String rate = tokenizer.nextToken();
    String[] s = date.split("/");
    Date d = new Date(Integer.valueOf(s[0]).intValue(), Integer.valueOf(s[1]).intValue(),
            Integer.valueOf(s[2]).intValue());

for(String val1 : list.iterator()){
        StringTokenizer tokenizer2 = new StringTokenizer(val1.toString(), "-");
        // Acquire User Name, Date, And Rating Value And Create Date Object
        String name2 = tokenizer2.nextToken();
        String date2 = tokenizer2.nextToken();
        String rate2 = tokenizer2.nextToken();
        String[] s2 = date.split("/");
        Date d2 = new Date(Integer.valueOf(s[0]).intValue(), Integer.valueOf(s[1]).intValue(),
                Integer.valueOf(s[2]).intValue());
        //Delete If There Is Same Date And User
        if(d2.equals(d)&&name2.equals(name)){
        list.remove(val1);
        break;
        }
      }
    }
//Register Reverse Reduce Resul
//Example of Reverse Reduce Result:(Jiro-3/2-4, Kenji-3/3-2, Satoshi-3/4-2)
...
}
```

FIG. 29

CODE EXAMPLE OF REDUCE PROCESS

```
//Pseudo Code of Reduce Process in Phase 1
public class CollaborativeFiltering_phase1_Reduce implements Reducer<Text, ArrayWritable,
Text, MapWritable> {
    //Acquire Result of Reverse Reduce Process. Example:(Jiro-3/2-4, Kenji-3/3-2, Satoshi-
3/4-2)
    public List<String> init(Text key){···}

//key:Product ID, values:List of Ratings of Individual Users And Rating Dates
    protected void reduce(Text key, Iterable<Text> values, Context context) throws
        IOException, InterruptedException {
        //Data Example of List:(Jiro-3/2-4, Kenji-3/3-2, Satoshi-3/4-2)
        List<String> list = init(key);
        for (Text value : values) {
            //Divide Character String Using "-"
            StringTokenizer tokenizer = new StringTokenizer(value.toString(), "-");
            // Acquire User Name, Date, And Rating Value And Create Date Object
            String name = tokenizer.nextToken();
            String date = tokenizer.nextToken();
            String rate = tokenizer.nextToken();
            String[] s = date.split("/");
            Date d = new Date(Integer.valueOf(s[0]).intValue(),
                    Integer.valueOf(s[1]).intValue(),Integer.valueOf(s[2]).intValue());

for(String val1 : list.iterator()){
                StringTokenizer tokenizer2 = new StringTokenizer(val1.toString(),"-");
                // Acquire User Name, Date, And Rating Value And Create Date Object
                String name2 = tokenizer2.nextToken();
                String date2 = tokenizer2.nextToken();
                String rate2 = tokenizer2.nextToken();
                // Create Date Object
                String[] s2 = date.split("/");
                Date d2 = new Date(Integer.valueOf(s[0]).intValue(),Integer.valueOf(s[1]).intValue(),
                        Integer.valueOf(s[2]).intValue());
                //Delete If There Is Information of Same User With Older Date
                if(d.after(d2)&&name2.equals(name)){
                    list.remove(val1);
                    break;
                }
            list.add(value.toString());
            }
        }
    //Register Product Name in Key And Map of Users And Rating Values for Product Name in
Value
        context.write(key, list);
    }
}
```

DATA PROCESSING METHOD AND DISTRIBUTED PROCESSING SYSTEM

CROSS-REFERENCE TO RELATED APPLICATION

This application is based upon and claims the benefit of priority of the prior Japanese Patent Application No. 2012-000598, filed on Jan. 5, 2012, the entire contents of which are incorporated herein by reference.

FIELD

The embodiments discussed herein are related to a data processing method and a distributed processing system.

BACKGROUND

Data processing may be performed using a distributed processing system equipped with multiple nodes (for example, information processing apparatuses such as computers) connected to a network. The data processing may be speeded up by dividing data, assigning the divided data to the multiple nodes, and using the nodes in parallel. Such parallelization of data processing is performed in order to process a large amount of data, for example, to analyze access log data which indicates accesses made to a server apparatus. In order to support creating a program for performing parallel data processing, frameworks such as MapReduce have been proposed. A data processing method defined in MapReduce includes a Map phase and a Reduce phase. In the Map phase, input data is divided into pieces, which are then processed using multiple nodes. In the Reduce phase, the results of the Map phase are aggregated using one or more nodes according to keys or the like. The results of the Reduce phase may be passed on to the next Map phase. The framework may be caused to automatically execute the data division and aggregation.

Reuse of past processing results has been considered in order to further speed up data processing. For example, a technology has been proposed in which reuse of results of a Reduce phase is made possible by classifying pieces of data into multiple groups based on update frequency of each data piece, calculating data update frequency with respect to each of the groups, and caching results of the Reduce phase, which results are obtained from data pieces belonging to groups with low update frequency. Another proposed technology is that, if input search criteria are the same as those in a previous search in a document management system, a search is made only with respect to documents whose registration time or update time is later than the time of the previous search and, then, the result of the previous search is added to the result of the current search.
Japanese Laid-open Patent Publication No. 2010-92222
Japanese Laid-open Patent Publication No. 2002-259443

A distributed processing system is considered which performs a first process on an input data set using multiple nodes and, then, aggregates the results of the first process in a second process. In the case of performing data processing on an input data set in this distributed processing system, if data processing was performed in the past on another input data set which includes an overlapping part with the input data set to be currently processed, it is preferable to be able to reuse results of the past data processing. However, if there is a difference between the current input data set and the past input data set, it may be difficult to reuse the results of the past data processing.

SUMMARY

According to one aspect, there is provided a data processing method to be executed in a system for performing a first process on input data using multiple nodes and performing a second process on a result of the first process. The data processing method includes searching a storage apparatus that stores one or more results of the second process, corresponding to input data sets processed in the past, for a result of the second process, corresponding to a second input data set having an overlapping part with a first input data set, when the first input data set is designated; acquiring a result of the first process, corresponding to differential input data that is included in the second input data set but not included in the first input data set; and generating a result of the second process, corresponding to the first input data set, by removing the effect of the differential input data from the result of the second process, corresponding to the second input data set, using the result of the first process, corresponding to the differential input data.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 8 illustrates an example of a Reduce result table according to the second embodiment;

FIGS. 14A and 14B illustrate examples of codes for a word count operation according to the second embodiment;

FIG. 15 illustrates an example of a Map result table according to the second embodiment;

FIG. 17 illustrates an example of a rating value table according to the third embodiment;

FIG. 24 illustrates an example of a Reduce result table according to the third embodiment;

FIG. 28 illustrates an example of a code for a reverse Reduce process according to the third embodiment;

FIG. 29 illustrates an example of a code for a Reduce process according to the third embodiment.

DESCRIPTION OF EMBODIMENTS

Figure 1:
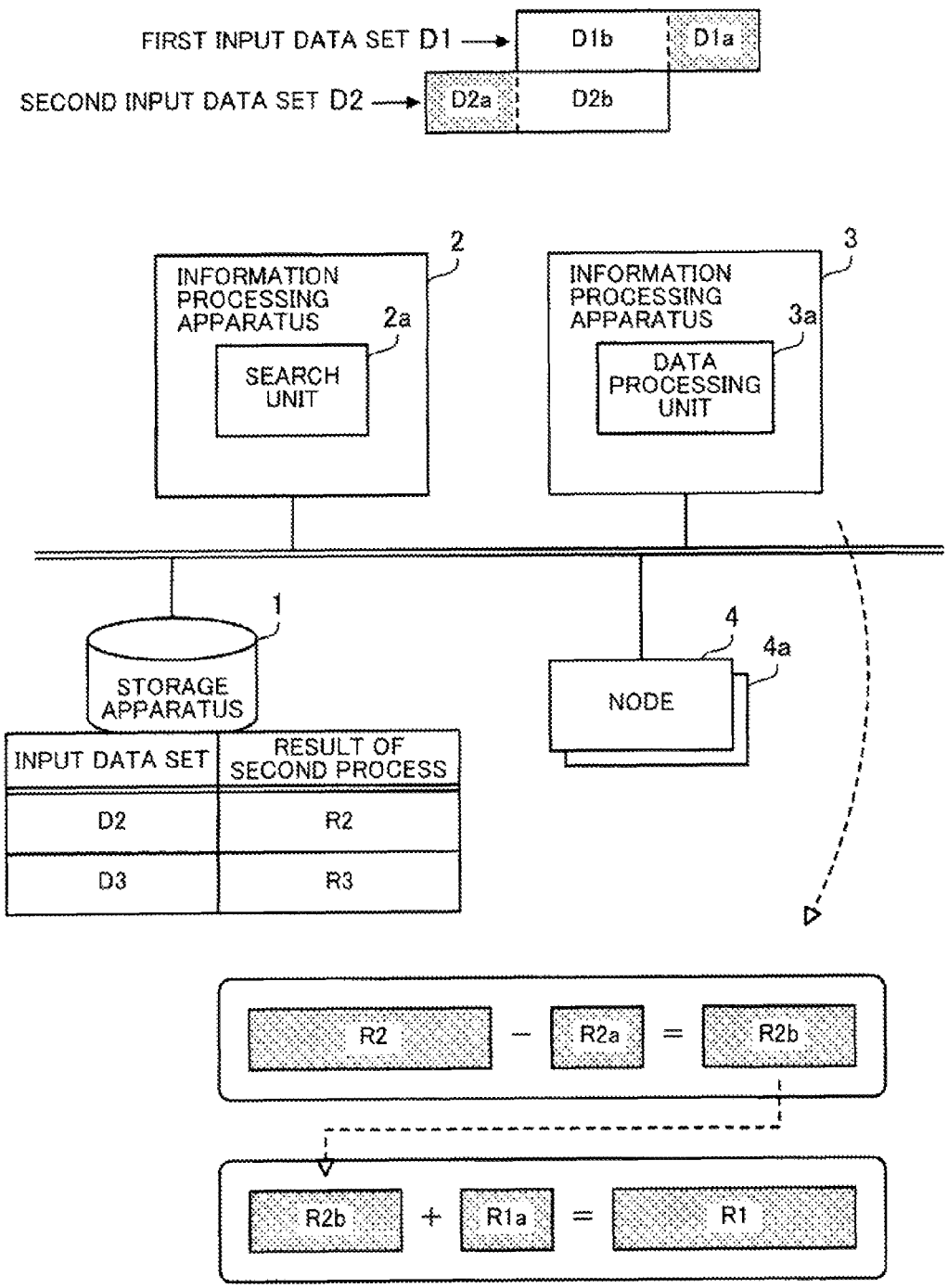
FIG. 1 illustrates a distributed processing system according to a first embodiment.

Several embodiments will be described below with reference to the accompanying drawings, wherein like reference numerals refer to like elements throughout.

(a) First Embodiment

FIG. 1 illustrates a distributed processing system according to a first embodiment. The distributed processing system of the first embodiment is a system for performing a second process on results of a first process which is performed on input data using multiple nodes. The distributed processing system of the first embodiment includes a storage apparatus 1, information processing apparatuses 2 and 3, and nodes 4 and 4a. The storage apparatus 1, the information processing apparatuses 2 and 3, and the nodes 4 and 4a are connected to each other by a network. The nodes 4 and 4a perform data processing.

When the first process is performed, an input data set is, for example, divided into multiple blocks, which are then input to the nodes 4 and 4a. Since there are two nodes 4 and 4a according to the example of the first embodiment, the input data set is divided into two blocks. Note however that three or more nodes may be provided. In the first process, each of the nodes 4 and 4a generates a result for an assigned block of the input data set. That is, the result of the first process is a collection of the results generated by the nodes 4 and 4a. The second process aggregates, for example, the collection of the results. Each of the information processing apparatuses 2 and 3 and the nodes 4 and 4a may be a computer equipped with a processor, such as a central processing unit (CPU), and a memory, such as a random access memory (RAM). In this case, the processor executes a program stored in the memory.

The storage apparatus 1 stores results of the second processes performed on input data sets in the past. The information processing apparatus 2 includes a search unit 2a. If a first input data set D1 is designated, the search unit 2a searches the storage apparatus 1 for a result R2 of the second process, corresponding to a second input data set D2 which has an overlapping part with the first input data set D1. The information processing apparatus 3 includes a data processing unit 3a. The data processing unit 3a acquires a result R2a of the first process, corresponding to differential input data D2a, which is included in the second input data set D2 but not included in the first input data set D1. Using the acquired result R2a of the first process, the data processing unit 3a removes the effect of the differential input data D2a from the found result R2 of the second process to thereby generate a result R1 of the second process, corresponding to the first input data set D1. The nodes 4 and 4a individually execute the first process on an input data set and generate results of the first process. Note that the search unit 2a and the data processing unit 3a may be provided in a single information processing apparatus. In addition, the process of the data processing unit 3a may be executed by the nodes 4 and 4a.

According to the distributed processing system of the first embodiment, when the first input data set D1 is designated, the search unit 2a searches the storage apparatus 1 for the result R2 of the second process, corresponding to the second input data set D2 which has an overlapping part with the first input data set D1. The data processing unit 3a acquires the result R2a of the first process, corresponding to the differential input data D2a, which is included in the second input data set D2 but not included in the first input data set D1. Using the acquired result R2a of the first process, the data processing unit 3a removes the effect of the differential input data D2a from the found result R2 of the second process to thereby generate the result R1 of the second process, corresponding to the first input data set D1.

With this, it is possible to improve the reusability of past processing results. For example, it is sometimes the case that a distributed processing system performs the first process on an input data set using multiple nodes and, then, sums results of the first process in the second process. It is considered that, in the distributed processing system, a result of the second process is stored and reused. However, if the result of the second process is a summed result, the processing result may not be divided post hoc in such a manner as to correspond to the range of the input data. Because of this, if there is a difference between a current input data set and a past input data set, it may be difficult to reuse the past processing result as it stands.

In view of the above, the distributed processing system according to the first embodiment acquires a result of the first process, corresponding to differential input data which is included in a past input data set but not included in the current input data set. Then, using the result of the first process, corresponding to the differential input data, the effect of the differential input data is removed from a result of the second process, corresponding to the past input data set. With this, it is possible to improve the reusability of the result of the second process, corresponding to the past input data set.

Note that there may be another differential input data, which is included in the current input data set but not included in the past input data set. According to the example of FIG. 1, this is differential input data D1a which is included in the first input data set D1 but not included in the second input data set D2. In this case, a result R1a of the first process may be acquired for the differential input data D1a. That is, when the effect of the differential input data D2a is removed from the result R2 of the second process, a result R2b of the second process is obtained, which corresponds to input data D2b that is a part of the second input data set D2, overlapping with the first input data set D1. The input data D2b corresponding to the overlapping part is equal to the input data D1b that is a part of the first input data set D1, overlapping with the second input data set D2. Therefore, the result R2b of the second process is equal to the result of the second process, corresponding to the input data D1b of the overlapping part. Accordingly, the result R1 of the second process, corresponding to the first input data set D1 is obtained by combining the result R2b of the second process and the result R1a of the second process.

In the above-described manner, by improving the reusability of results of the second processes, corresponding to past input data sets, it is possible to efficiently perform the process of generating the result of the second process, corresponding to the current input data set. Further, results R2 and R3 of the second processes, corresponding to multiple second input data sets D2 and D3, respectively, each of which has an overlapping part with the first input data set D1 may be found as a result of a search. In that case, a result of the second process, corresponding to an input data set having the largest overlapping range may be selected from among the input data sets. As the overlapping range is larger, the range for which past results may be used is larger. As a result, the range for the current input data, required to be processed is reduced, and thus, the data processing is performed further efficiently.

(b) Second Embodiment

Figure 2:
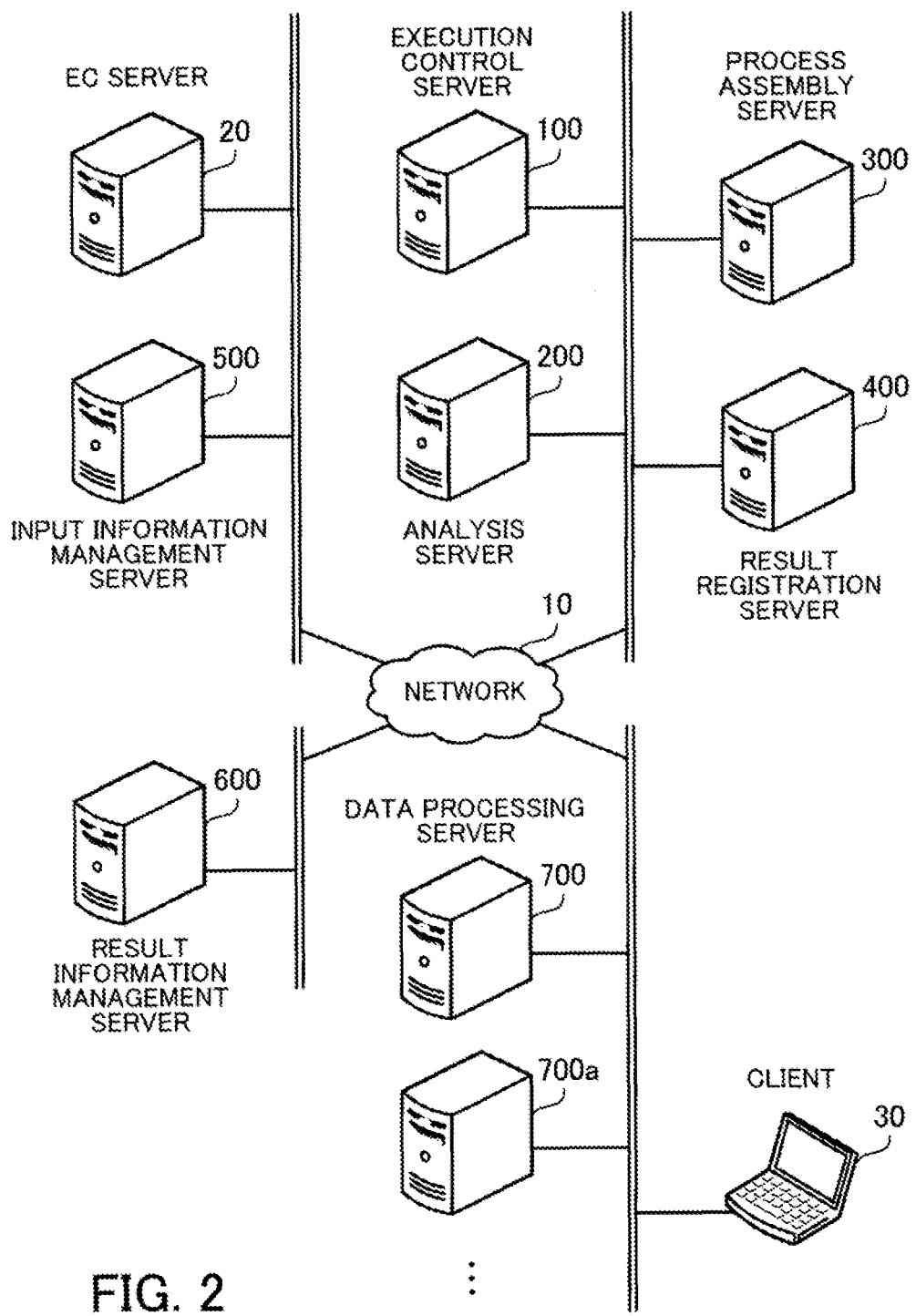
FIG. 2 illustrates a distributed processing system according to a second embodiment.

FIG. 2 illustrates a distributed processing system according to a second embodiment. The distributed processing system of the second embodiment causes multiple nodes to perform distributed processing of counting character strings (including characters) included in input log data (the process may be hereinafter referred to as the "word count"). The distributed processing system of the second embodiment uses MapReduce for the distributed processing. As a framework for using MapReduce, for example, Hadoop is known.

The distributed processing system of the second embodiment includes an electronic commerce (EC) server 20, a client 30, an execution control server 100, an analysis server 200, a process assembly server 300, a result registration server 400, an input information management server 500, a result information management server 600, and data processing servers 700, 700a, . . . . The individual servers are connected to a network 10. The network 10 is, for example, a local area network (LAN). In addition, the network 10 is connected to the Internet (not illustrated).

The EC server 20 is a server computer for providing a product sales service of electronic commerce. The EC server 20 receives purchase requests for products from customers. The EC server 20 stores, in the input information management server 500, log entries indicating contents of the products purchased by the customers. The client 30 is a client computer operated by an administrator who manages the distributed processing system. On receiving a predetermined operation input from the administrator, the client 30 requests the execution control server 100 to aggregate log data stored in the input information management server 500. The process request includes information indicating a period of time for the aggregation (time range) and information of character strings indicating products to be counted. The administrator operates the client 30 to input the period of time and the character strings.

The execution control server 100 is a server computer for exercising overall control over the entire distributed processing system. In response to an instruction from the client 30, the execution control server 100 controls the execution of distributed processing in cooperation with other servers. More specifically, the execution control server 100 requests the analysis server 200 to analyze log data of the designated period of time. When receiving a result of the analysis from the analysis server 200, the execution control server 100 requests the process assembly server 300 to assemble a MapReduce job for the word count. The assembly request includes information indicating the analysis result. Based on a result of the MapReduce job assembled by the process assembly server 300, the execution control server 100 controls the data processing servers 700, 700a, . . . to execute the word count for the designated character strings. For example, the execution control server 100 assigns Map tasks or Reduce tasks to servers in an idle state among the data processing servers 700, 700a, . . . . A node for exercising control, like the execution control server 100, may be referred to as the "master".

The analysis server 200 is a server computer for executing an analytical process of log data. On receiving a request for analyzing log data from the execution control server 100, the analysis server 200 analyzes log entries of the designated period of time by referring to the log data stored in the input information management server 500. More specifically, the analysis server 200 compares past processing results stored in the result information management server 600 with the currently designated period of time and carries out a search to see if, among the past processing results, there is a result usable for a result of the current MapReduce job. The analysis server 200 returns the analysis result to the execution control server 100.

The process assembly server 300 is a server computer for executing an assembly process of a MapReduce job. On receiving, from the execution control server 100, a request for assembling a MapReduce job and the analysis result obtained by the analysis server 200, the process assembly server 300 executes the assembly process. More specifically, in the case where, among the past processing results, there is a result usable for the result of the current MapReduce job, the process assembly server 300 assembles the MapReduce job using the usable past processing results. If there is no usable result in the past processing results, the process assembly server 300 assembles the MapReduce job with respect to the entire input data.

The result registration server 400 is a server computer for acquiring results of Reduce tasks performed by the data processing servers 700, 700a, . . . and registering the results of Reduce tasks in the result information management server 600. The input information management server 500 is a server computer for managing input information. The input information is log data recorded by the EC server 20. The result information management server 600 is a server computer for managing result information. The result information is the results of Reduce tasks, registered by the result registration server 400. The data processing servers 700, 700a, . . . are server computers for performing parallel processing of data. Each of the data processing servers 700, 700a, . . . executes a Map task of a Reduce task assigned by the execution control server 100. Both a Map task and a Reduce task may be assigned to a single data processing server. Such a node in charge of parallel processing of data may be referred to as the "worker" or "slave".

Figure 3:
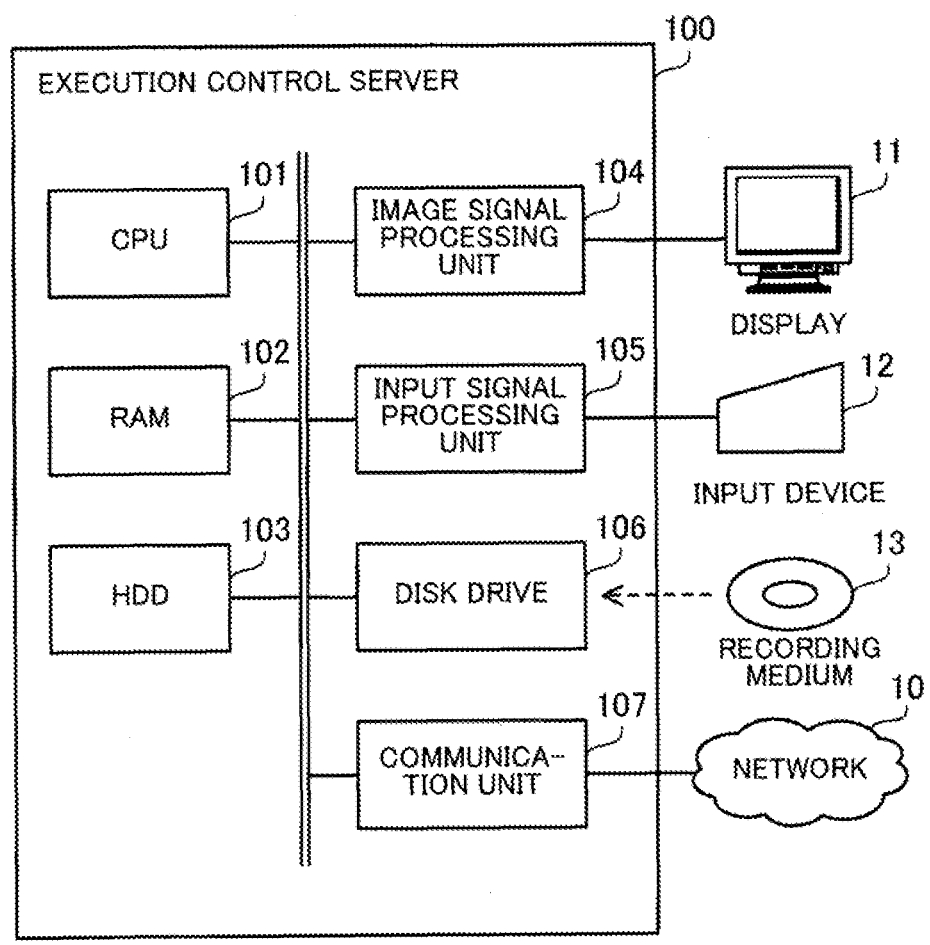
FIG. 3 illustrates an example of hardware of an execution control server according to the second embodiment.

FIG. 3 illustrates an example of hardware of an execution control server according to the second embodiment. The execution control server 100 includes a CPU 101, a RAM 102, a hard disk drive (HDD) 103, an image signal processing unit 104, an input signal processing unit 105, a disk drive 106, and a communication unit 107. The individual components are connected to a bus in the execution control server 100. Other servers and the client may be implemented using components of hardware that are similar to those of the execution control server 100.

The CPU 101 is a processor for controlling information processing of the execution control server 100. The CPU 101 reads at least part of programs and data stored in the HDD 103, loads the read programs into the RAM 102, and executes the programs. Note that the execution control, server 100 may have multiple processors to execute the programs in a distributed manner. The RAM 102 is a volatile memory for temporarily storing programs and data to be used by the CPU 101. Note that the execution control server 100 may include a different type of memory other than the RAM, or may include multiple memories. The HDD 103 is a nonvolatile storage device for storing programs, such as an operating system (OS) program and application programs, and data. The HDD 103 reads and writes data from and to a built-in magnetic disk according to instructions from the CPU 101. Note that the execution control server 100 may include a different type of nonvolatile storage device (for example, a solid state drive (SSD)) other than the HDD, or may include multiple storage devices.

According to an instruction from the CPU 101, the image signal processing unit 104 outputs an image to a display 11 connected to the execution control server 100. As the display 11, a cathode ray tube (CRT) display or a liquid crystal display, for example, may be used. The input signal processing unit 105 acquires an input signal from an input device 12 connected to the execution control server 100 and outputs the signal to the CPU 101. As the input device 12, a pointing device, such as a mouse and a touch panel, or a keyboard, for example, may be used.

The disk drive 106 is a drive apparatus for reading programs and data recorded in a recording medium 13. The following may be used as the recording medium 13: a magnetic disk, such as a flexible disk (FD) and a HDD; an optical disk, such as a compact disc (CD) and a digital versatile disc (DVD); or a magneto-optical disk (MO). The disk drive 106 stores the programs and data read from the recording medium 13 in the RAM 102 or the HDD 103 according to, for example, instructions from the CPU 101. The communication unit 107 is a communication interface for performing communication with other servers via the network 10. The communication unit 107 may be either a wire communication interface or a wireless communication interface.

Figure 4:
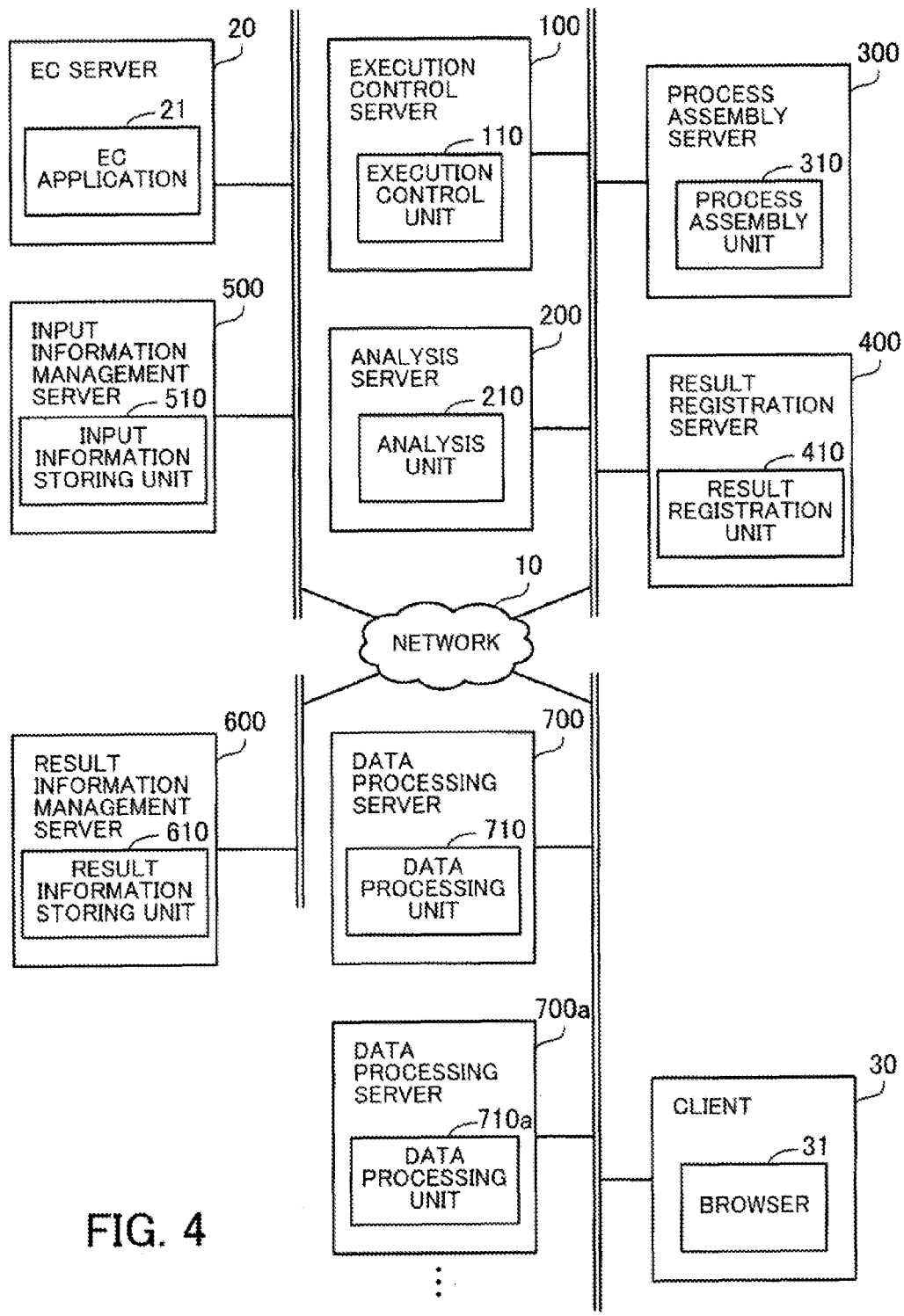
FIG. 4 illustrates an example of software according to the second embodiment.

FIG. 4 illustrates an example of software according to the second embodiment. Part or all of the components illustrated in FIG. 4 may be modules of a program executed by each server. In addition, part or all of the units illustrated in FIG. 4 may be achieved by an electronic circuit, such as a field programmable gate array (FPGA) and an application specific integrated circuit (ASIC). The EC server 20 includes an EC application 21. The EC application 21 is an application for providing a function of electronic commerce. The EC server 20 functions as a Web server. The EC application 21 is available as a Web application on the Web server from a terminal device operated by a user. The client 30 includes a browser 31. The browser 31 is a Web browser for making Web access to the execution control sever 100 (the execution control server 100 also functions as a Web server). The administrator operates the browser 31 to thereby request the execution control server 100 to perform a word count operation. Together with the word count request, the administrator is able to input information used for the word count operation (a target period of time of the word count operation, character strings to be searched, and the like). Note that the word count request from the client 30 to the execution control server 100 may be made using a command line interface (CLI).

The execution control server 100 includes an execution control unit 110. The execution control unit 110 controls the execution of distributed processing. The execution control unit 110 starts a word count operation in response to the word count request received from the client 30. The execution control unit 110 requests the analysis server 200 to analyze log entries made during the designated period of time. After acquiring the analysis result from the analysis server 200, the execution control unit 110 requests the process assembly server 300 to assemble a MapReduce job for the word count operation. The assembly request includes information indicating the analysis result. After acquiring the assembly result from the process assembly server 300, the execution control unit 110 assigns Map tasks and Reduce tasks to the data processing servers 700, 700a, . . . based on the assembly result. Input data for the Map tasks is log entries made during the designated period of time.

The execution control unit 110 returns, to the client 30, a result of the word count, obtained by the distributed processing of the MapReduce job. In addition, the execution control unit 110 transmits results of the Reduce tasks to the result registration server 400. The analysis server 200 includes an analysis unit 210. In response to an analysis request from the execution control unit 110, the analysis unit 210 executes an analysis of log entries made during the designated period of time by referring to information stored in the input information management server 500 and the result information management server 600, and returns the analysis result to the execution control unit 110.

The process assembly server 300 includes a process assembly unit 310. On receiving the assembly request and the analysis result from the execution control unit 110, the process assembly unit 310 executes the assembly process of a MapReduce job, and then returns the assembly result to the execution control unit 110. The result registration server 400 includes a result registration unit 410. The result registration unit 410 acquires the results of Reduce tasks from the execution control unit 110 and registers the results in the result information management server 600. The input information management server 500 includes an input information storing unit 510. The input information storing unit 510 stores the input information.

The result information management server 600 includes a result information storing unit 610. The result information storing unit 610 stores the result information. The data processing server 700 includes a data processing unit 710. When a Map task is assigned by the execution control unit 110, the data processing unit 710 acquires a part of the input data and executes the Map task. When a Reduce task is assigned by the execution control unit 110, the data processing unit 710 executes the Reduce task on results of Map tasks, and returns a result of the Reduce task to the execution control server 100.

Figure 5:
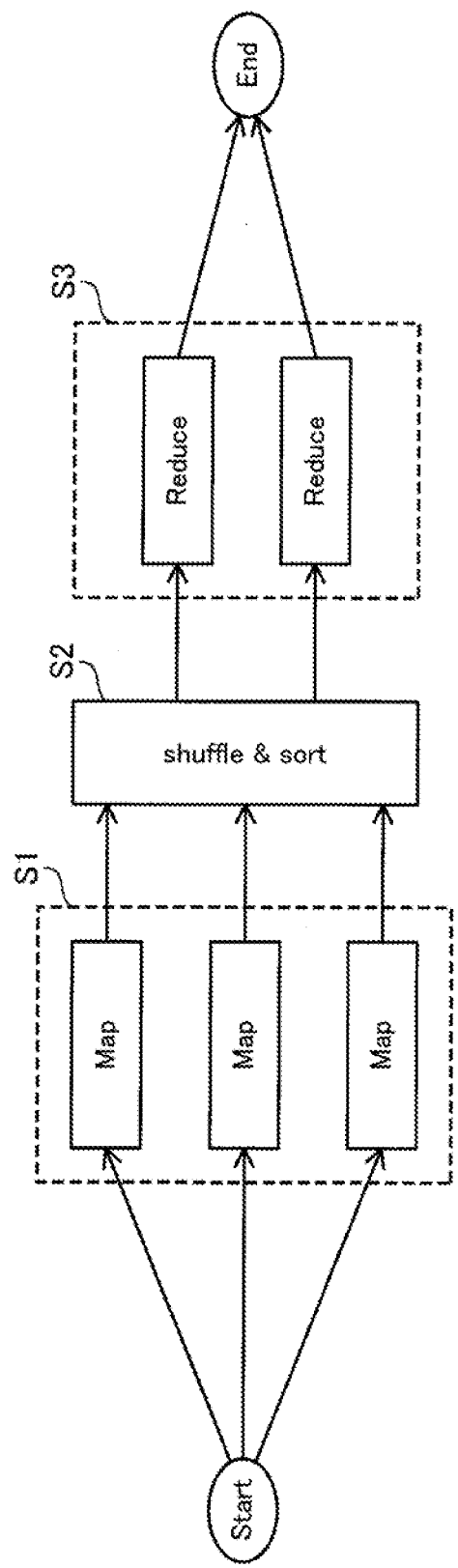
FIG. 5 illustrates an example of a MapReduce job according to the second embodiment.

FIG. 5 illustrates an example of a MapReduce job according to the second embodiment. The word count executed by the distributed processing system of the second embodiment includes steps S1, S2, and S3. Step S1 is a Map process. In the Map process, each data processing unit generates a pair of a key and a value (sometimes hereinafter referred to as the "key-value pair") with respect to a part of the input data, assigned to the data processing unit. More specifically, the key is information of a character string indicating a product. The value is the number of the character string included in the part of the input data. Note that, in the following description, an operation performed by each of the data processing units on the assigned part of the input data is referred to as the "task", and an overall operation made up of such tasks is referred to as the "process". More specifically, according to the example of FIG. 5, S1 (enclosed by the dashed line) is a "process", and each Map (enclosed by the solid line) included in S1 is a "task".

Step S2 is a shuffle & sort process. To step S2, the output of step S1 is input. In the shuffle & sort process, input key-value pairs are sorted by the key so that all key-value pairs with the same key are aggregated together. The key-value pairs with the same key are input to a single data processing unit, which executes a Reduce task. According to the distributed processing system of the second embodiment, the data processing servers 700, 700a, . . . execute the shuffle & sort process in a coordinated manner. Step S3 is a Reduce process. To step S3, the output of step S2 is input. In the Reduce process, new key-value pairs are output by merging the input key-value pairs. As for each of the output key-value pairs, the key is information of a character string indicating a product, and the value is the number of the character string included in the entire range of the input data.

Figure 6:
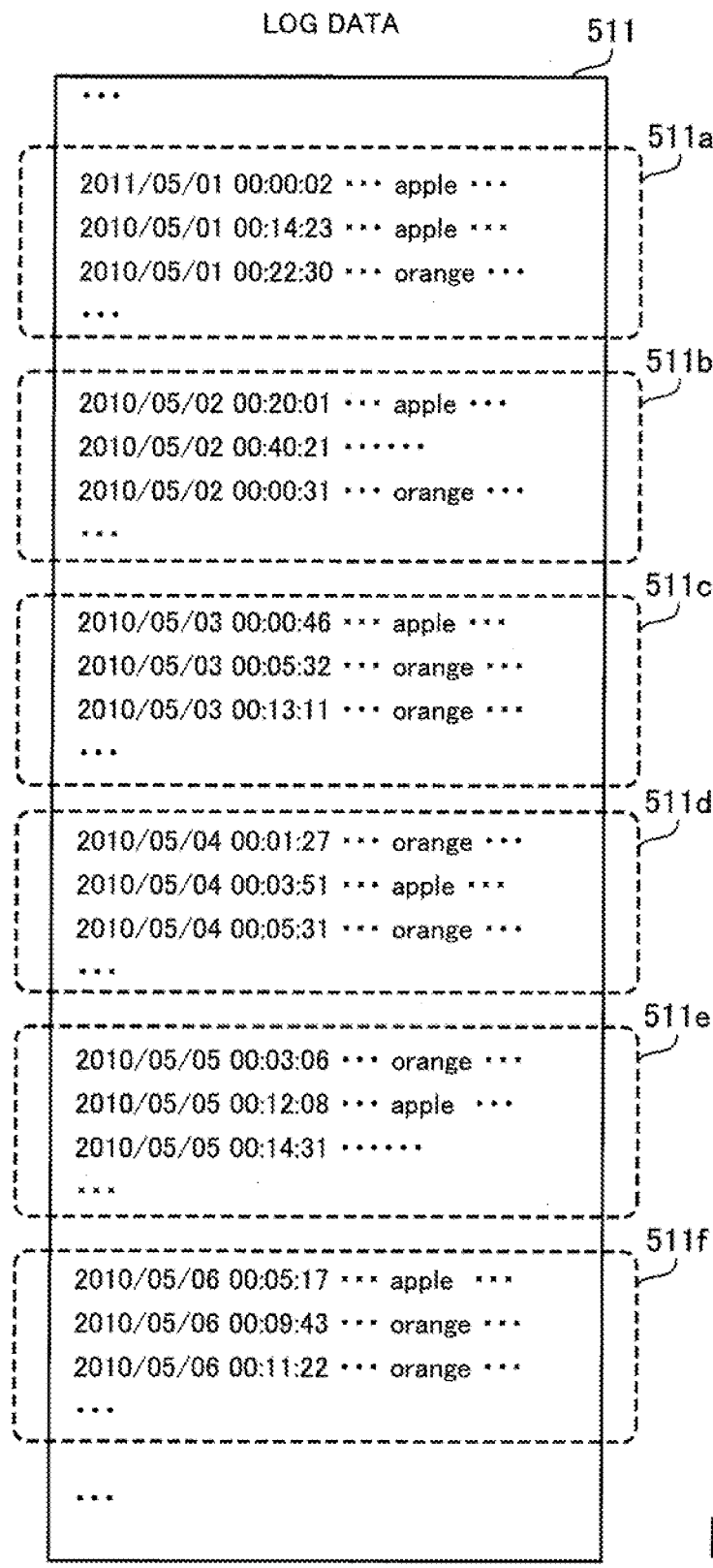
FIG. 6 illustrates an example of log data according to the second embodiment.

FIG. 6 illustrates an example of log data according to the second embodiment. Log data 511 is stored in the input information storing unit 510. The first line of the log data 511 includes a time stamp. For example, a time stamp "2011/05/01 00:00:02" indicates that a log entry of the first line was recorded at 0 o'clock, 0 minute, and 2 seconds on May 1, 2011. In addition, the first line of the log data 511 includes a message indicating the content of the log entry. For example, a message " . . . apple . . . " includes a name of a purchased product "apple". Data of one line in the log data 511 corresponds to one record of the log data 511. That is, the log data 511 is a collection of records.

Assume here that the input data is divided into data blocks according to the date and the data blocks are input to the data processing units 710, 710a, . . . , each of which subsequently carries out a Map task. A collection of records of May 1 is a log data block 511a. A collection of records of May 2 is a log data block 511b. A collection of records of May 3 is a log data block 511c. A collection of records of May 4 is a log data block 511d. A collection of records of May 5 is a log data block 511e. A collection of records of May 6 is a log data block 511f. That is, the log data blocks 511a, 511b, 511c, 511d, 511e, and 511f are subsets of the log data 511. Note that, in order to divide the log data 511, another criterion other than the date may be used. For example, the log data 511 may be divided on an hourly basis (for example, the period of time from 1 o'clock to just before 2 o'clock, and the period of time from 2 o'clock to just before 3 o'clock). Alternatively, the division may be made on a weekly basis (for example, the first week and the second week).

Figure 7:
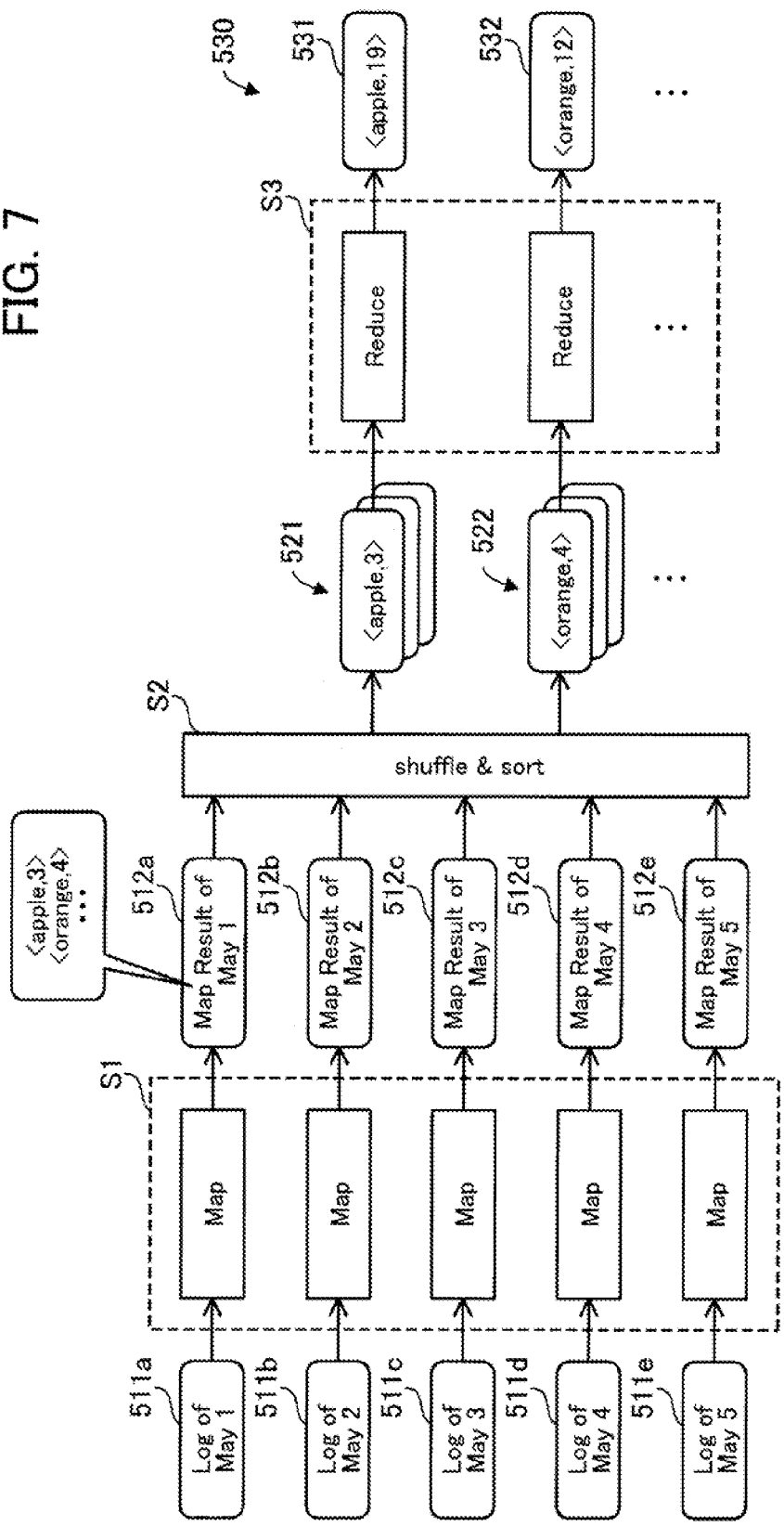
FIG. 7 illustrates a process example of the log data according to the second embodiment.

Next described is a word count in the distributed processing system according to the second embodiment in the case of not using past results. Assume in the following description that character strings including "apple" and "orange" are designated as targets for the word count. FIG. 7 illustrates a process example of log data according to the second embodiment. FIG. 7 illustrates a case of performing the word count using, as the input data, log entries belonging to the period from May 1 to 5. In step S1, the log data blocks 511a, 511b, 511c, 511d, and 511e are input to the data processing units 710, 710a, . . . , which individually carry out a Map task to thereby generate Map results 512a, 512b, 512c, 512d, and 512e, respectively. The Map result 512a is a result of the Map task performed on the log data block 511a (for May 1). For example, the Map result 512a includes key-value pairs <apple, 3>, <orange, 4>, and the like. The Map result 512b is a result of the Map task performed on the log data block 511b (for May 2). The Map result 512c is a result of the Map task performed on the log data block 511c (for May 3). The Map result 512d is a result of the Map task performed on the log data block 511d (for May 4). The Map result 512e is a result of the Map task performed on the log data block 511e (for May 5).

In step S2, the data processing units 710, 710a, . . . carry out the shuffle & sort process with respect to the Map results 512a, 512b, 512c, 512d, and 512e. Then, the data processing units 710, 710a, . . . generate shuffle & sort process results 521, 522, . . . for the individual search-target character strings. The shuffle & sort process result 521 is a result of the shuffle & sort process for the character string "apple". For example, the shuffle & sort process result 521 is a collection of key-value pairs whose key is "apple" among the Map results 512a, 512b, 512c, 512d, and 512e. Note that the shuffle & sort process result 521 may be acquired as a key-values pair which is formed by merging the collection of key-value pairs by the key (for example, <apple, 3,4,5, . . . >). Similarly, the shuffle & sort process result 522 is a result of the shuffle & sort process for the character string "orange".

In step S3, the shuffle & sort process results 521, 522, . . . are input to the data processing units 710, 710a, . . . , which individually carry out a Reduce task to thereby generate Reduce results 531, 532, . . . . The Reduce results 531, 532, . . . are key-value pairs. As described above, the key is information of a character string, and the value is the total number of the character string included in the input data. For example, the Reduce result 531 is a result of the Reduce task for the character string "apple". The Reduce result 532 is a result of the Reduce task for the character string "orange". A Reduce result 530 which is a sum-up of the Reduce results 531, 532, . . . is the final processing result of the word count operation.

As described above, in the case of not using past results, the MapReduce job is executed on the entire range of the input data. The Reduce result 530 is registered in the result information storing unit 610 by the result registration server 400.

FIG. 8 illustrates an example of a Reduce result table according to the second embodiment. A Reduce result table 611 is stored in the result information storing unit 610. The Reduce result table 611 includes items of input data identifier and Reduce result. In each field under the item of input data identifier, identification information of input data (sometimes hereinafter referred to as the "input data identifier") pertaining to a corresponding Reduce result is registered. The input data identifier includes information indicating the processing target range of the input data. For example, an input data identifier "2011/05/01-2011/05/05-Reduce" indicates that the period of time between May 1, 2011 and May 5, 2011 is the processing target range. In a corresponding field under the item of Reduce result, a Reduce result for the input data of the processing target range is registered.

Figure 9:
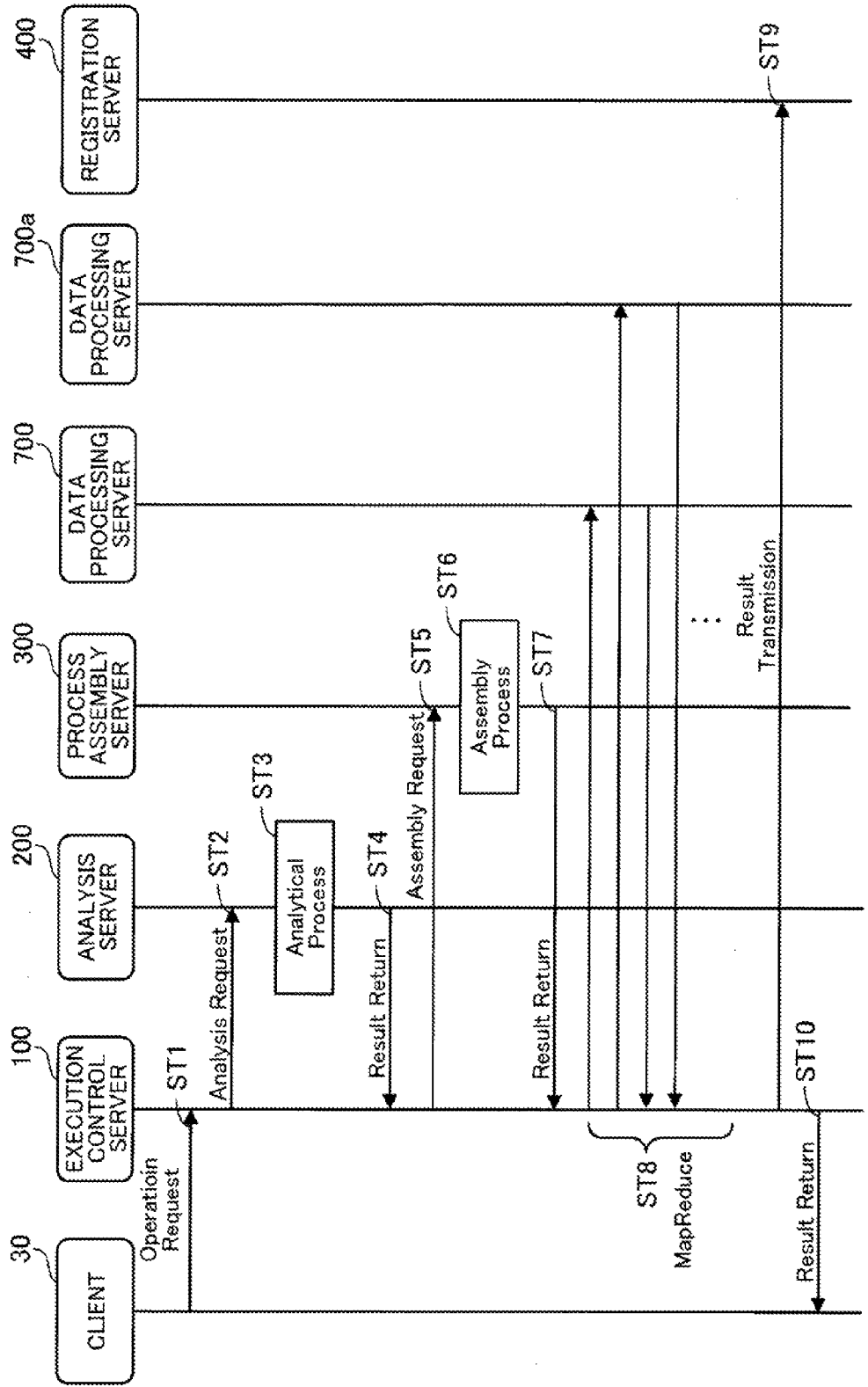
FIG. 9 is a sequence diagram illustrating an example of distributed processing according to the second embodiment.

Next described is a procedure of the distributed processing in the distributed processing system with the above-described configuration. First, the overall flow of the distributed processing is described. FIG. 9 is a sequence diagram illustrating an example of distributed processing according to the second embodiment. The distributed processing of FIG. 9 is described next according to the step numbers in the sequence diagram.

(Step ST1) The client 30 transmits a request for a word count operation to the execution control server 100. The request includes information regarding an operation target period of time and search-target character strings. The execution control server 100 receives the request.

(Step ST2) The execution control server 100 transmits an analysis request to the analysis server 200. The analysis request includes information regarding the operation target period of time. Assume here that a period of time is designated using a range of dates (for example, "2011/05/02 to 2011/05/06). The analysis server 200 receives the analysis request.

(Step ST3) By referring to the input information storing unit 510 and the result information storing unit 610, the analysis server 200 executes an analytical process on log data of the designated period of time (sometimes hereinafter referred to as the "current input data") to thereby obtain an analysis result. The details of the analytical process are described later.

(Step ST4) The analysis server 200 returns the analysis result to the execution control server 100. The execution control server 100 receives the analysis result.

(Step ST5) The execution control server 100 transmits an assembly request for the word count operation using MapReduce to the process assembly server 300. The assembly request includes information regarding the analysis result. The process assembly server 300 receives the assembly request.

(Step ST6) The process assembly server 300 executes the assembly process and obtains the assembly result. The details of the assembly process are described later.

(Step ST7) The process assembly server 300 returns the assembly result to the execution control server 100. The execution control server 100 receives the assembly result.

(Step ST8) Based on the assembly result, the execution control, server 100 assigns Map tasks and Reduce tasks to the data processing servers 700, 700a, . . . and causes the data processing servers 700, 700a, . . . to carry out a word count operation for the designated character strings. Data processing servers other than the data processing servers 700 and 700a are not illustrated in FIG. 9. The execution control server 100 receives results of the word count (corresponding to the Reduce results 531, 532, . . . ) for the individual character strings from the data processing servers 700, 700a, . . . .

(Step ST9) The execution control server 100 transmits the results of the word count to the result registration server 400. The result registration server 400 associates the received results of the word count with a corresponding input data identifier and registers the results with the association in the Reduce result table 611 stored in the result information storing unit 610.

(Step ST10) The execution control server 100 returns the result of the word count to the client 30.

Figure 10:
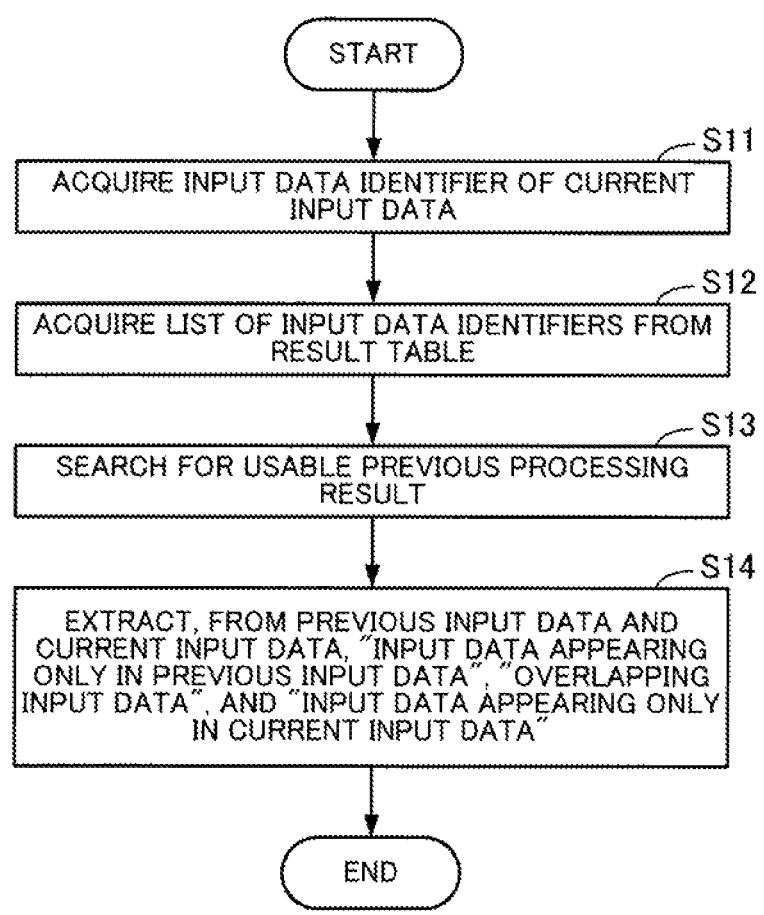
FIG. 10 is a flowchart illustrating an example of an analytical process according to the second embodiment.

In the above-described manner, according to the distributed processing system of the second embodiment, the process assembly server 300 assembles a MapReduce job before the execution. The assembly is made in a manner according to the analysis result of the analysis server 200. Next described is a procedure of the analytical process of step ST3. FIG. 10 is a flowchart illustrating an example of an analytical process according to the second embodiment. The analytical process of FIG. 10 is described next according to the step numbers in the flowchart.

(Step S11) By referring to the input information storing unit 510, the analysis unit 210 acquires log data of a period of time designated as the processing target period (i.e. current input data). The analysis unit 210 acquires an input data identifier corresponding to the input data. The analysis unit 210 obtains the input data identifier by connecting the first and the last date of the designated period of time with a hyphen "-" and then connecting the connected dates and a character string "Reduce" with a hyphen "-".

(Step S12) The analysis unit 210 acquires, from the Reduce result table 611 stored in the result information storing unit 610, a list of input data identifiers corresponding to input data processed in the past.

(Step S13) By cross-checking the input data identifier of the current input data acquired in step S11 with the list of input data identifiers acquired in step S12, the analysis unit 210 searches for a past processing (Reduce) result usable for obtaining the result of the current word count. More specifically, the analysis unit 210 searches for a past processing result whose period of time overlaps the period of time indicated by the input data identifier of the current input data (sometimes hereinafter referred to as the "period of the current input data"). If multiple processing results are found, one having the longest overlapping period is selected. Here, the found processing result is referred to the "previous processing result" to be used for obtaining the result of the current word count. In addition, input data processed in the past to generate the "previous processing result" is referred to as the "previous input data". In this example, the "previous input data" is log data of the period of time indicated by an input data identifier corresponding to the "previous processing result" (sometimes hereinafter referred to as the "period of the previous input data"). Note that in the case where no "previous processing result" is found, step S14 is skipped and the analytical process is terminated.

(Step S14) The analysis unit 210 extracts, from the previous input data and the current input data, the following three types of data. The first data is "input data appearing only in the previous input data". The "input data appearing only in the previous input data" is log data of a period of time which is included in the period of the previous input data but not included in the period of the current input data. The second data is "overlapping input data". The "overlapping input data" is log data of a period of time included in both the period of the previous input data and the period of the current input data. The third data is "input data appearing only in the current input data". The "input data appearing only in the current input data" is log data of a period of time which is not included in the period of the previous input data but included in the period of the current input data.

In the above-described manner, the analysis unit 210 analyzes the input data. Note that the analysis unit 210 may have transmitted the input data identifier acquired in step S11 to the execution control server 100. In that case, for example, the execution control server 100 transmits, to the result registration server 400, Reduce results of the current input data, received from the data processing servers 700, 700a, . . . , together with the input data identifier. Then, the result registration server 400 is able to register the Reduce results in association with the input data identifier in the result information storing unit 610.

Figure 11:
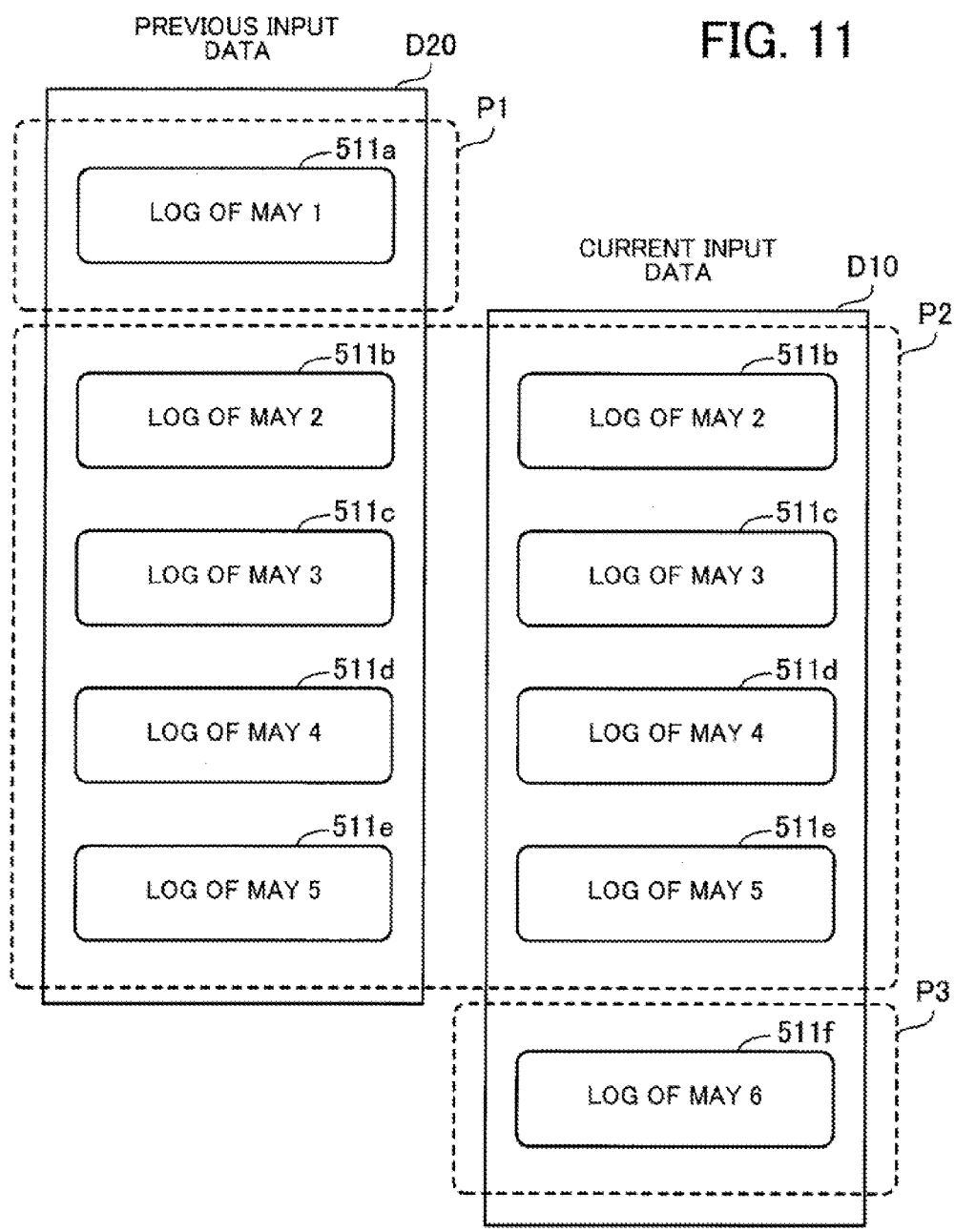
FIG. 11 illustrates an example of a result of the analytical process according to the second embodiment.

FIG. 11 illustrates an example of a result of the analytical process according to the second embodiment. According to the example of FIG. 11, current input data D10 is a collection of the log data blocks (or may also be said to be a collection of records included in the individual log data blocks) 511b, 511c, 511d, 511e, and 511f of May 2 to 6. Previous input data D20 is a collection of the log data blocks (or may also be said to be a collection of records included in the individual log data blocks) 511a, 511b, 511c, 511d, and 511e of May 1 to 5. In this case, input data P1 appearing only in the previous input data is the log data block 511a of May 1. Overlapping input data P2 is the log data blocks 511b, 511c, 511d, and 511e of May 2 to 5. Input data P3 appearing only in the current input data is the log data block 511f of May 6.

Figure 12:
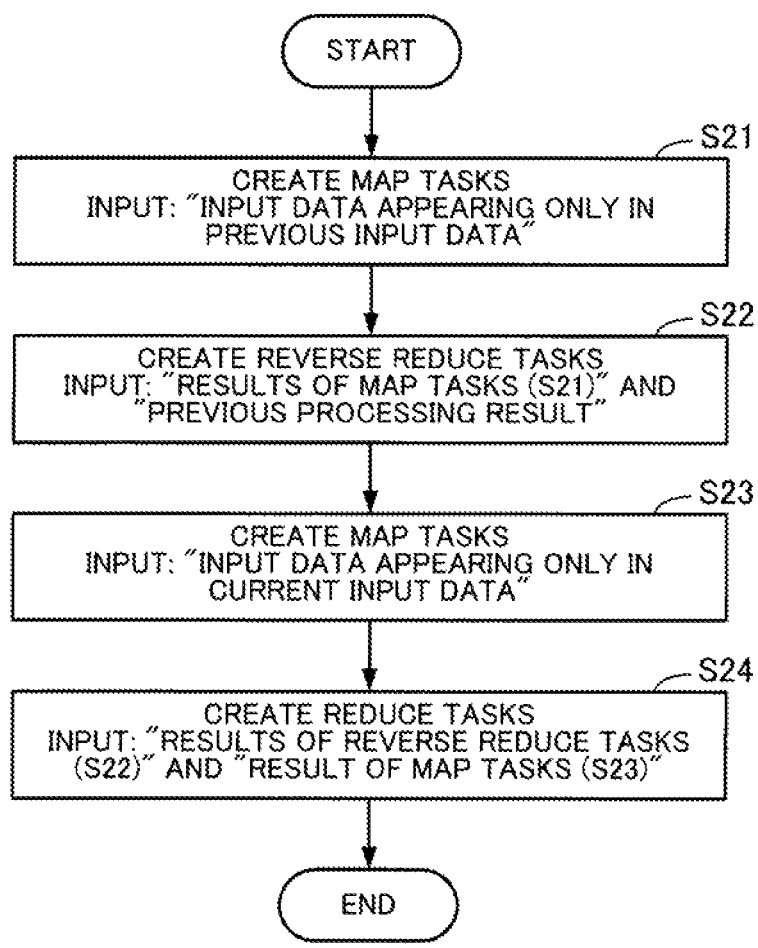
FIG. 12 is a flowchart illustrating an example of distributed processing control according to the second embodiment.

Here, the process assembly unit 310 assembles a MapReduce job in step ST6 of FIG. 9. At this time, if the MapReduce job is executed for the entire input data, the process assembly unit 310 assembles the procedure illustrated in FIG. 7. On the other hand, for divided data as illustrated in FIG. 11, the process assembly unit 310 assembles a procedure different from the procedure of FIG. 7. Next described is a procedure of the assembly process performed on divided data as illustrated in FIG. 11. FIG. 12 is a flowchart illustrating an example of distributed processing control according to the second embodiment. The distributed processing control of FIG. 12 is described next according to the step numbers in the flowchart.

(Step S21) The process assembly unit 310 creates Map tasks using the input data P1 appearing only in the previous input data as the input.

(Step S22) The process assembly unit 310 creates reverse Reduce tasks using, as the input, results of the Map tasks of step S21 and the previous processing result corresponding to the previous input data D2. Here, the reverse Reduce tasks are performed in order to remove the effect of the input data P1 appearing only in the previous input data from the previous processing result.

(Step S23) The process assembly unit 310 creates Map tasks using the input data P3 appearing only in the current input data as the input.

(Step S24) The process assembly unit 310 creates Reduce tasks using, as the input, results of the reverse Reduce tasks of step S22 and the result of the Map process of step S23.

In the above-described manner, the process assembly unit 310 assembles the MapReduce job. Regarding this, the assembly is made in such a manner as to cause the Map tasks created in step S21 and the Map tasks created in step S23 to be executed in parallel. Alternatively, the assembly is made in such a manner as to cause the reverse Reduce tasks created in step S22 and the Map tasks created in step S23 to be executed in parallel. The execution control unit 110 assigns the Map tasks, reverse Reduce tasks, and Reduce tasks assembled by the process assembly unit 310 to the data processing servers 700, 700a, . . . . Note that step S23 may be carried out before step S21.

Figure 13:
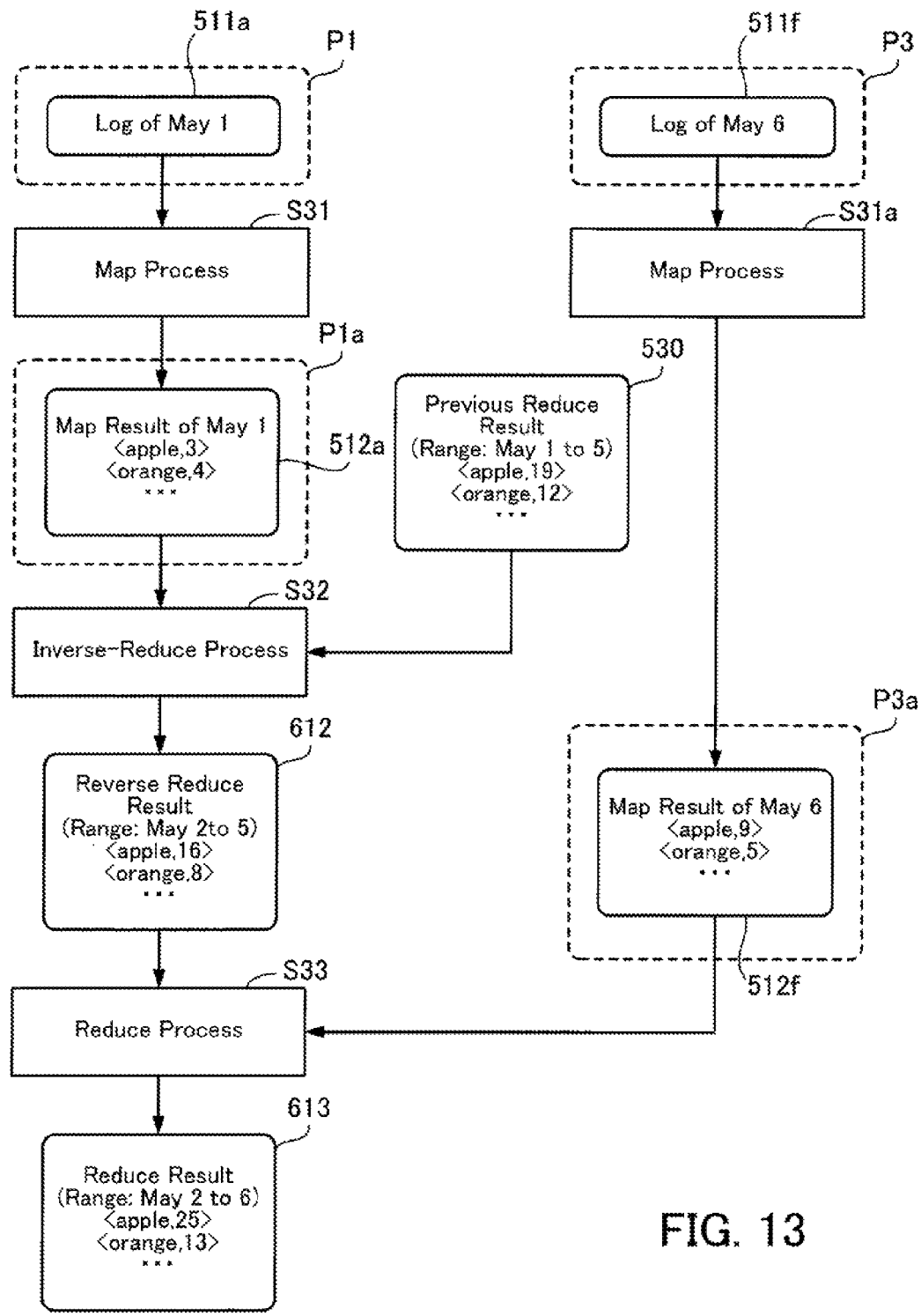
FIG. 13 illustrates an example of the distributed processing according to the second embodiment.

The following specifically describes inputs and outputs of the Map tasks, reverse Reduce tasks, and Reduce tasks for the word count, assembled in the above-described manner. Assume here that the previous input data D20 is used in order to obtain the processing result of the current input data D10. FIG. 13 illustrates an example of distributed processing according to the second embodiment. The distributed processing of FIG. 13 is described next according to the step numbers.

(Step S31) The data processing units 710, 710a, . . . collectively execute a Map process on the input data P1 appearing only in the previous input data to thereby generate a Map result P1a corresponding to the input data P1 appearing only in the previous input data. To each of the data processing units 710, 710a, . . . , a block (range) of the input data for the Map process is assigned by the execution control unit 110, and each of the data processing units 710, 710a, . . . performs a Map task on the assigned block of the input data. In this example, the input data is divided according to the date and, thus, one day is a Map task unit. Here, the input data P1 appearing only in the previous input data is the log data block 511a of May 1. Accordingly, in this case, the Map process of step S31 is assigned to, for example, one data processing unit. Note however that the log data block 511a of May 1 may be further divided on an hourly basis or the like and the Map process (i.e., Map tasks) may be, then, assigned to multiple data processing units. In this manner, the Map process is performed at a high speed. The Map result P1a in this case is the Map result 512a of May 1 corresponding to the log data block 511a of May 1.

(Step S31a) The data processing units 710, 710a, . . . collectively execute a Map process on the input data P3 appearing only in the current input data to thereby generate a Map result P3a corresponding to the input data P3 appearing only in the current input data. Here, the input data P3 appearing only in the current input data is the log data block 511f of May 6. Accordingly, in this case, as in the Map process of step S31, the Map process may be assigned to one of the data processing units. Alternatively, the log data block 511f of May 6 is further divided on an hourly basis or the like and the Map process (i.e., Map tasks) may be, then, assigned to multiple data processing units. The Map result P3a in this case is the Map result 512f of May 6 corresponding to the log data block 511f of May 6. Note that steps S31 and S31a may be executed in parallel. For example, by executing step S31a using a data processing server other than the data processing server used in step S31, steps 31 and 31a are executed in parallel.

(Step S32) The data processing units 710, 710a, . . . collectively execute a shuffle & sort process on the Map result P1a. The data processing units 710, 710a, . . . acquire the previous processing result from the result information storing unit 610, and collectively execute a reverse Reduce process using a result of the shuffle & sort process to thereby generate a reverse Reduce result 612. In this example, the previous processing result is the previous Reduce result 530 corresponding to the previous input data D2. For example, the Map result 512a of May 1 includes the key-value pairs <apple,3> and <orange,4>. The previous processing result (the previous Reduce result 530) includes key-value pairs <apple,19> and <orange, 12>. In this case, for example, the data processing unit 710 performs a reverse Reduce task on the key "apple". More specifically, the data processing unit 710 subtracts <apple,3> from the previous processing result <apple,19> to thereby generate a key-value pair <apple,16>. In addition, for example, the data processing unit 710a performs a reverse Reduce task on the key "orange". More specifically, the data processing unit 710a subtracts <orange,4> from the previous processing result <orange,12> to thereby generate a key-value pair <orange,8>. The reverse Reduce result 612 is equal to a Reduce result corresponding to the overlapping input data P2.

(Step S33) The data processing units 710, 710a, . . . collectively execute a shuffle & sort process on the Map result P3a. The data processing units 710, 710a, . . . collectively execute a Reduce process using the reverse Reduce result 612 and a result of the shuffle & sort process to thereby generate a Reduce result 613. For example, the reverse Reduce result 612 includes the key-value pairs <apple,16> and <orange,8>. The Map result P3a includes key-value pairs <apple,9> and <orange,5>. In this case, for example, the data processing unit 710 performs a Reduce task on the key "apple". More specifically, the data processing unit 710 adds <apple, 9> to the reverse Reduce result <apple,16> to thereby generate a key-value pair <apple,25>. In addition, for example, the data processing unit 710a performs a Reduce task on the key "orange". More specifically, the data processing unit 710a adds <orange,5> to the reverse Reduce result <orange,8> to thereby generate a key-value pair <orange,13>.

In the above-described manner, the result of the MapReduce job for the current input data D10 is obtained using the previous input data D20. Here, in step S32, only the Map result P1a is a processing target. For example, the Map results P1a and P3a may be distinguished based on the individual data processing servers from which each of the Map results P1a and P3a has been acquired. The Map result acquired from the data processing server to which the Map process for the input data P1 appearing only in the previous input data was assigned is the Map result P1a. The Map result acquired from the data processing server to which the Map process for the input data P3 appearing only in the current input data was assigned is the Map result P3a. Alternatively, on the data processing server side, a predetermined flag may be added to the value of the key-value pair of the Map result P1a, which is a target for the reverse Reduce process.

Although steps S31 and S31a are executed in parallel, step S31a may be executed with step S32 in parallel. Alternatively, steps S31 and S31a may be executed in series. In the case of executing in series, the execution order of steps S31 and S31a may be arbitrarily determined. That is, step S31 may be executed first, or step S31a may be executed first.

The case illustrated in FIG. 11 is that the data is divided into three as a result of the analytical process performed on the current input data D10 and the previous input data D20. This is only one pattern of analysis results possibly obtained from the analytical process. The following patterns, which include the case just described, are possible.

(1) a case of not being able to find a "previous processing result"

(2) a case of being able to find a "previous processing result" and obtaining the overlapping input data P2 and the input data P3 appearing only in the current input data only (i.e., the input data P1 appearing only in the previous input data is not obtained): This is, for example, the case where the previous input data is log data of May 1 to 5 while the current input data is log data of May 1 to 6.

(3) a case of being able to find "previous processing result" and obtaining the input data P1 appearing only in the previous input data and the overlapping input data P2 only (i.e., the input data P3 appearing only in the current input data is not obtained): This is, for example, the case where the previous input data is log data of May 1 to 5 while the current input data is log data of May 2 to 5.

(4) a case of being able to find "previous processing result" and obtaining the input data P1 appearing only in the previous input data, the overlapping input data P2, and the input data P3 appearing only in the current input data: This is the case described in FIG. 11.

In the case where the analysis result is (1), the MapReduce job described in FIG. 5 is performed with respect to the entire current input data. In the case where the analysis result is (2), the Map process is executed on the input data P3 appearing only in the current input data (corresponding to step S31a), and the shuffle & sort process is executed on the Map result and, then, the shuffle & sort processing result is added to the previous processing result (corresponding to step S33). That is, steps S31 and S32 are skipped and the previous Reduce result 530 and the Map result P3a are used as the input of step S33. In the case where the analysis result is (3), the Map process is executed on the input data P1 appearing only in the previous input data (corresponding to step S31), and the shuffle & sort process is executed on the Map result and, then, the effect of the input data P1 appearing only in the previous input data is removed from the previous processing result (corresponding to step S32). That is, steps S31a and S33 are skipped and the reverse Reduce result 612 is the final result of the word count operation. The case where the analysis result is (4) is as described in FIG. 13.

FIGS. 14A and 14B illustrate examples of codes for the word count operation according to the second embodiment. FIG. 14A illustrates an example of a code for the Reduce process. FIG. 14B illustrates an example of a code for the reverse Reduce process. Note that, in each of the code examples, Java (registered trademark) is used as a programming language. In FIG. 14A, in class word count_Reduce, reduce method is defined. The reduce method is for summing the number of counts for a keyword by assigning an initial value of "0" to a variable, sum, which indicates the sum of count values for the keyword, and sequentially adding values of corresponding key-value pairs. In FIG. 14B, in class Word-Coutn_Reverse_Reduce, wordcount_reduce method and setSum method are defined. The wordcount_reduce method is for removing the effect of a differential summing result from a past summed result by sequentially subtracting values of key-value pairs from the variable sum indicating the sum of the count values for a corresponding keyword. The setSum method is for setting the value of the previous Reduce result as the initial value of the variable sum. By defining the above-described operations, it is possible to perform a reverse Reduce process for the word count operation.

As has been described above, in the distributed processing system according to the second embodiment, when a word count operation is performed on the current input data D10, the previous processing result corresponding to the previous input data D20, which has an overlapping part with the current input data D10, is searched. Next, a Map process is executed on the input data P1 appearing only in the previous input data and, then, a shuffle & sort process is executed on the result of the Map process. Subsequently, using the result of the shuffle & sort process, the effect of the input data P1 appearing only in the previous input data is removed from the previous processing result. With this, even when there is a difference between the current input data D10 and the previous input data D20, the previous processing result may be used. Therefore, it is possible to improve the usability of past processing results.

Note that, in the above-described example, in order to remove the effect of the input data P1 appearing only in the previous input data from the previous Reduce result, a Map process is performed on the input data P1 appearing only in the previous input data (corresponding to step S31) to acquire the Map result P1a. On the other hand, the method is not limited to this example and step S31 may be omitted instead. More specifically, a Map result corresponding to the previous input data may be stored in association with an input data identifier. When a word count operation is performed on the current input data, the Map result P1a (the differential Map result) corresponding to the input data P1 appearing only in the previous input data is extracted. Then, the word count operation starts with the shuffle & sort process performed on the Map result P1a. The following example illustrates how to store Map results to make this method work.

FIG. 15 illustrates an example of a Map result table according to the second embodiment. A Map result table 614 is stored in the result information storing unit 610. For example, the result registration unit 410 acquires Map results from the data processing unit 710, 710a, . . . and stores the acquired Map results with corresponding Map result identifiers. The Map result table 614 includes items of Map result identifier and Map result. In each field under the item of Map result identifier, a Map result identifier is registered. The Map result identifier is identification information for identifying a corresponding Map result. In each field under the item of Map result, a Map result is registered.

Here, for example, the input data is divided into blocks according to the date, and a Map task is performed on each of the input data blocks to thereby obtain Map results which individually correspond to a record of each date. Accordingly, the result registration unit 410 assigns information indicating a corresponding date to a Map result identifier of each of the Map results. For example, a Map result identifier "2011/05/01-Map" indicates the Map result 512a corresponding to the log data block 511a of May 1, 2011.

As described above, if the Map results corresponding to the previous input data are stored, the Map process for the input data P1 appearing only in the previous input data may be omitted when the word count operation of the current input data is performed. That is, since the Map result P1a corresponding to the input data P1 appearing in the previous input data is extracted, it is possible to start the word count operation with the shuffle & sort process for the Map result P1a.

(c) Third Embodiment

Next described is a third embodiment. The following description mainly focuses on differences from the above-described second embodiment while omitting repeated explanations. The second embodiment is described using an example of the word count operation. According to the word count operation, in the reverse Reduce process, the value corresponding to the data P1 appearing only in the previous input data is subtracted from the summed value of the previous processing result. With this, the effect of the data P1 appearing only in the previous input data is removed. On the other hand, the reverse Reduce process may be used for a purpose other than performing a subtraction. In view of this, the third embodiment illustrates a case where the reverse Reduce process is used for another process using MapReduce. The overall structure of a distributed processing system of the third embodiment is the same as that of the distributed processing system of the second embodiment described in FIG. 2. Individual servers included in the distributed processing system of the third embodiment are identified by the same names and reference numerals as those used in the second embodiment. An example of hardware and an example of software of each of the servers are individually the same as those of each server of the second embodiment, described in FIGS. 3 and 4, respectively. Components included in the individual servers of the third embodiment are identified by the same names and reference numerals as those of the second embodiment.

The distributed processing system according to the third embodiment receives, in an electronic commerce transaction, a rating value of a product from a user and extracts products to be recommended to the user based on the rating value. More specifically, based on the correlation between the rating value of the user and rating values of other users for each product, products for which the user is predicted to give high ratings are extracted and presented as recommended products. The distributed processing system of the third embodiment performs distributed processing on a large amount of rating data related to a large number of users and products to thereby execute the process of extracting products to be recommended at a high speed. Note that, in the following description, information of a rating value predicted for each user with respect to a product, output from the distributed processing system of the third embodiment, is sometimes referred to as the "recommended information".

The EC server 20 of the third embodiment receives a rating value for a product, given by a user. The user is able to transmit a rating value for each product to the EC server 20 by, for example, operating a terminal capable of communicating via the Internet. The EC server 20 stores, in the input information management server 500, the input rating value in association with information of the user (for example, a user name) and a time stamp indicating the time when the rating value is received.

Figure 16:
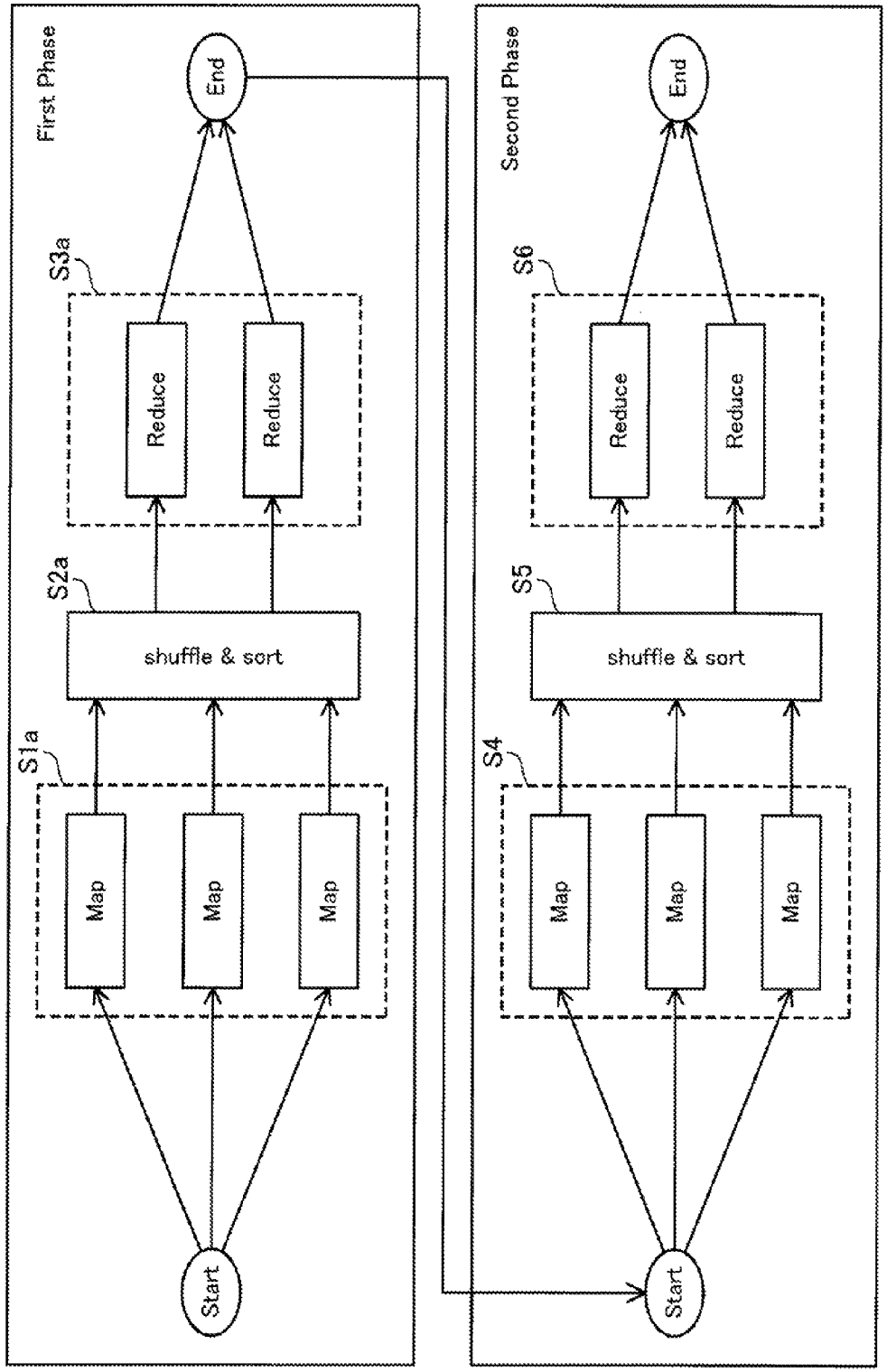
FIG. 16 illustrates an example of a MapReduce job according to a third embodiment.

FIG. 16 illustrates an example of a MapReduce job according to the third embodiment. According to the distributed processing system of the third embodiment, MapReduce is used in two phases, a first phase and a second phase, until recommended information is generated. The first and second phases are carried out by the data processing servers 700, 700a, . . . . As a result of the first and second phases, the correlation of rating values among users may be obtained. Based on the correlation of rating values among users, products for which each user is predicted to give high ratings are extracted and presented as recommended products.

The first phase includes steps S1a, S2a, and S3a. Step S1a is a first Map process. To step S1a, data in comma separated value (CSV) format is input. The input data includes user names, information indicating products, rating dates, and rating values. In step S1a, key-value pairs are generated based on the input data. More specifically, each key is information indicating a product. Each value is a set made up of a name of a user (user name) who having rated a corresponding product, a rating value, and a rating date. Step S2a is a first shuffle & sort process. To step S2a, the output of step S1a is input. In step S2a, the input key-value pairs are sorted by the key and the sorted result is output. At this point, the output is made in such a manner that key-value pairs having the same key are input to the same data processing unit. Step S3a is a first Reduce process. To step S3a, the output of step S2a is input. In step S3a, the data input thereto is merged to thereby output new key-value pairs. More specifically, each key is information indicating a product. Each value is a set made up of rating values of all users for a corresponding product.

The second phase includes steps S4, S5, and S6. Step S4 is a second Map process. To step S4, the output of step S3a is input. In step S4, based on the data input thereto, new key-value pairs are output. More specifically, each key is a set made up of a user name and another user name. Each value is a set made up of rating values individually given by corresponding users. Step S5 is a second shuffle & sort process. To step S5, the output of step S4 is input. In step S5, the input key-value pairs are sorted by the key and the sorted result is output. Step S6 is a second Reduce process. To step S6, the output of step S5 is input. In step S6, based on the input key-value pairs, the correlation coefficient between users is obtained, which represents the degree of rating similarity, Similarity(user 1,user 2). For example, the degree of similarity between users "Taro" and "Jiro", Similarity(T,J) ("T" indicates "Taro" and "J" indicates "Jiro"), is obtained by the following expression (1).

$$\text{Similarity}(T, J) = \frac{\text{Cov}(T, J)}{\sigma_T \sigma_J} \frac{\sum_i (T_i - \overline{T})(J_i - \overline{J})}{\sqrt{\sum_i (T_i - \overline{T})^2} \sqrt{\sum_i (J_i - \overline{J})^2}} \quad (1)$$

Here, Cov(T,J) is a covariance between the rating values of the users "Taro" and "Jiro". σT is the standard deviation of the rating value of "Taro", and σJ is the standard deviation of the rating value of "Jiro". Ti is a rating value given by "Taro" for a product "Item", and Ji is a rating value given by "Jiro" for the product "Item". T with a superscript bar denotes the arithmetic average of Ti, and similarly, J with a superscript bar denotes the arithmetic average of Ji.

In the above-described manner, the first and second phases are carried out to thereby calculate correlation coefficients between individual users. Using the correlation coefficients between individual users, a predicted rating value, Rate (T, item) ("T" indicates "Taro"), of "Taro" for the product "Item" may be obtained by the following expression (2).

$$\text{Rate}(T, \text{Item}) = \overline{T} + \frac{\sum_{user} \{(\text{Rate}(user, \text{Item}) - \overline{user}) * \text{Similarity}(T, user)\}}{\sum_{user} |\text{Rate}(user, \text{Item})|} \quad (2)$$

Here, Σ denotes the sum of all users that gave ratings to the "Item" during a period of time for the calculation. "User" with a superscript bar denotes the arithmetic average of rating values of the all users during the period of time.

FIG. 17 illustrates an example of a rating value table according to the third embodiment. A rating value table 513 is stored in the input information storing unit 510. The rating value table 513 includes items of date, product ID (IDentifier), and rating value. In each field under the item of date, a date on which a corresponding rating value was input is registered. In each field under the item of product ID, information indicating a product for rating is registered. In each field of the item of rating value, a rating value given by a user for a product having a corresponding product ID is registered. For example, a rating value "1" is registered, which is input by a user "Taro" on Mar. 1, 2011 for a product having a product ID "Item 1". Assume here that a higher rating value indicates a higher rating. Note that as long as the data registered in the input information storing unit 510 includes items of the same sort, the data may have a different data format, such as CSV format.

Figure 18:
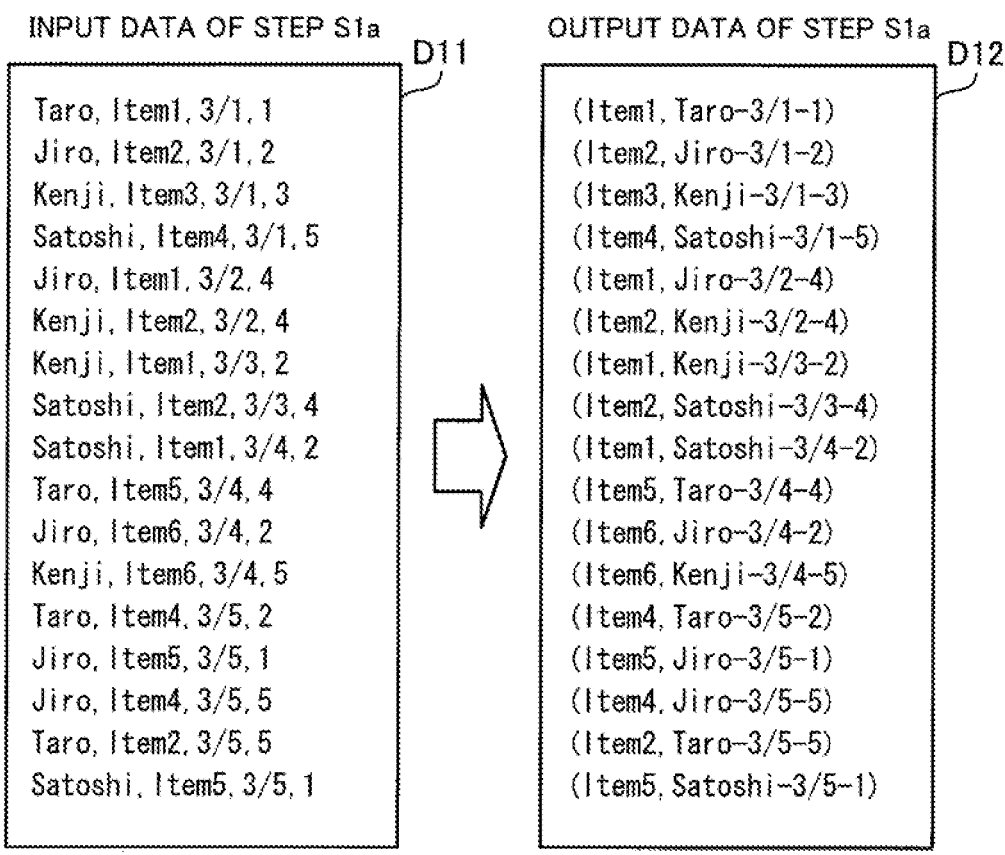
FIG. 18 illustrates an input and output example of first Map according to the third embodiment.

FIG. 18 illustrates an input and output example of first Map according to the third embodiment. Data D11 is input data of step S1a (the first Map process). The data D11 is information of a period of time designated by the administrator, extracted from the rating value table 513 in CSV format. In the data D11, information is described in the order of user name, product ID, rating date, and rating value. Data D12 is output data of step S1a. The data D12 includes key-value pairs whose keys are the product IDs included in the data D11. Each value of the key-value pairs is represented by individual entries of user name, rating data, and rating value connected one to the other with "-" (hyphens).

Figure 19:
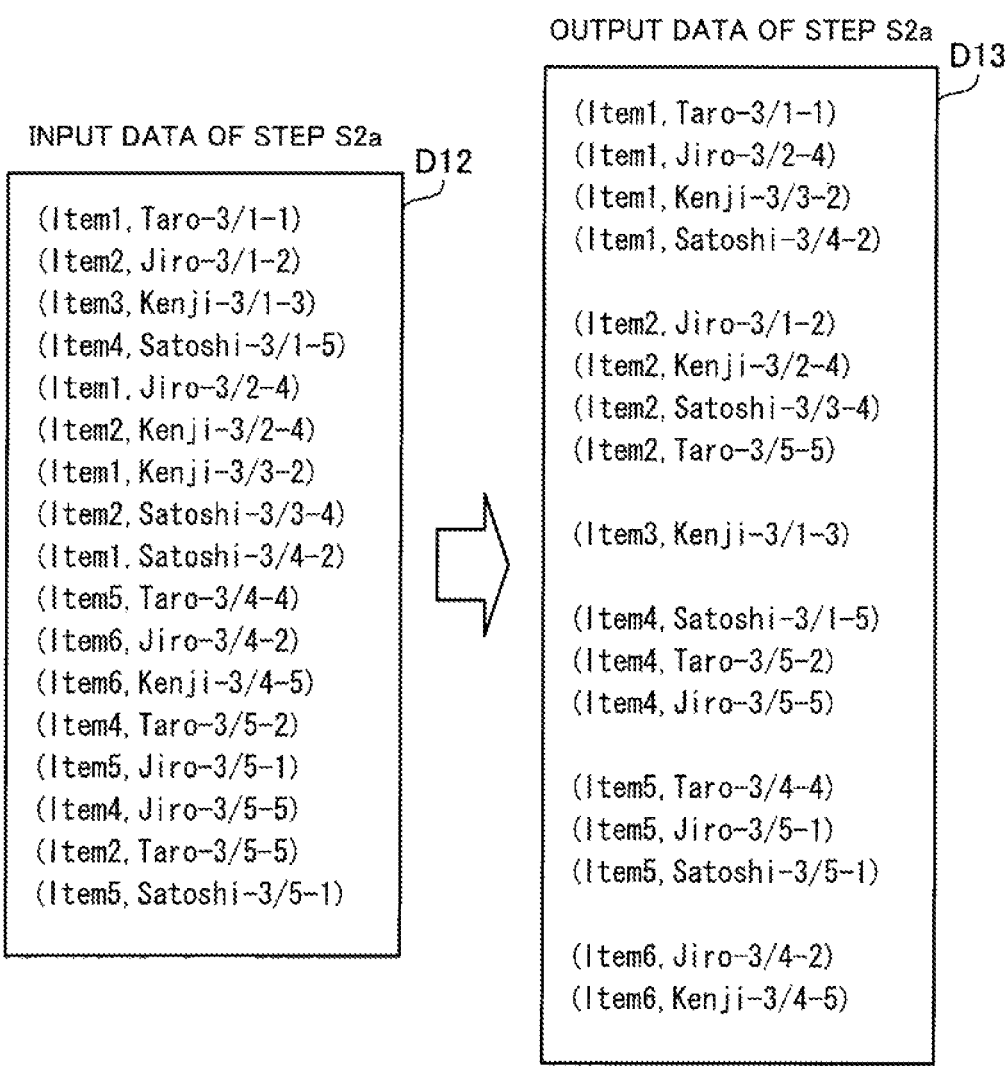
FIG. 19 illustrates an input and output example of first shuffle & sort according to the third embodiment.

FIG. 19 illustrates an input and output example of first shuffle & sort according to the third embodiment. The data D12 is output data of step S1a and input data of step S2a (the first shuffle & sort process). Data D13 is output data of step S2a. The data D13 is obtained by sorting the key-value pairs of the data D12 by the key (product ID).

Figure 20:
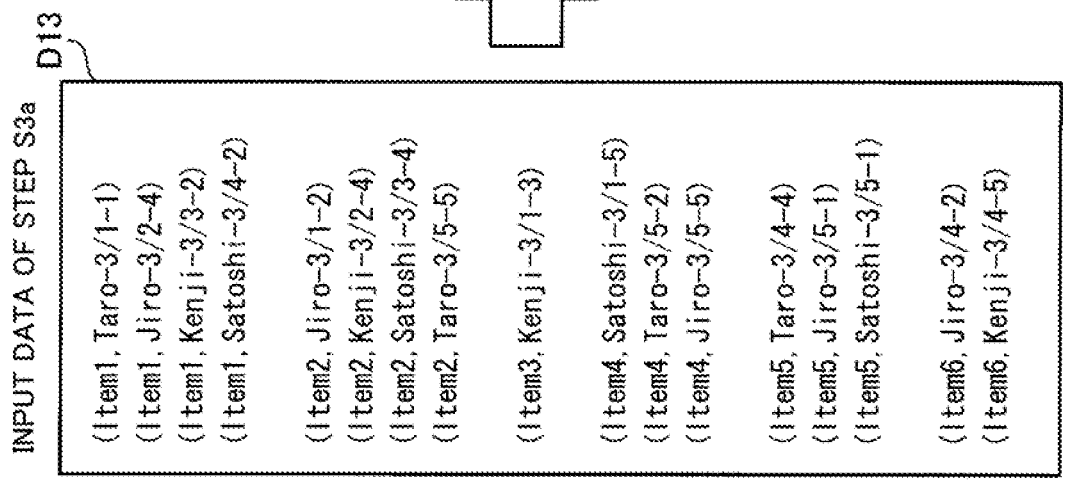
FIG. 20 illustrates an input and output example of first Reduce according to the third embodiment.

FIG. 20 illustrates an input and output example of first Reduce according to the third embodiment. The data D13 is output data of step S2a and input data of step S3a (the first Reduce process). Data D14 is output data of step S3a. The data D14 is obtained by merging the key-value pairs of the data D13 by the key (product ID), and is an aggregate of rating values of all users with respect to each of the product IDs. For example, as values for each key (product ID), sets each including a user and a rating value are extracted only for users who gave ratings for a product having the product ID. Note that if the same user has given a rating to a single item more than once, the latest rating value is adopted.

Figure 21:
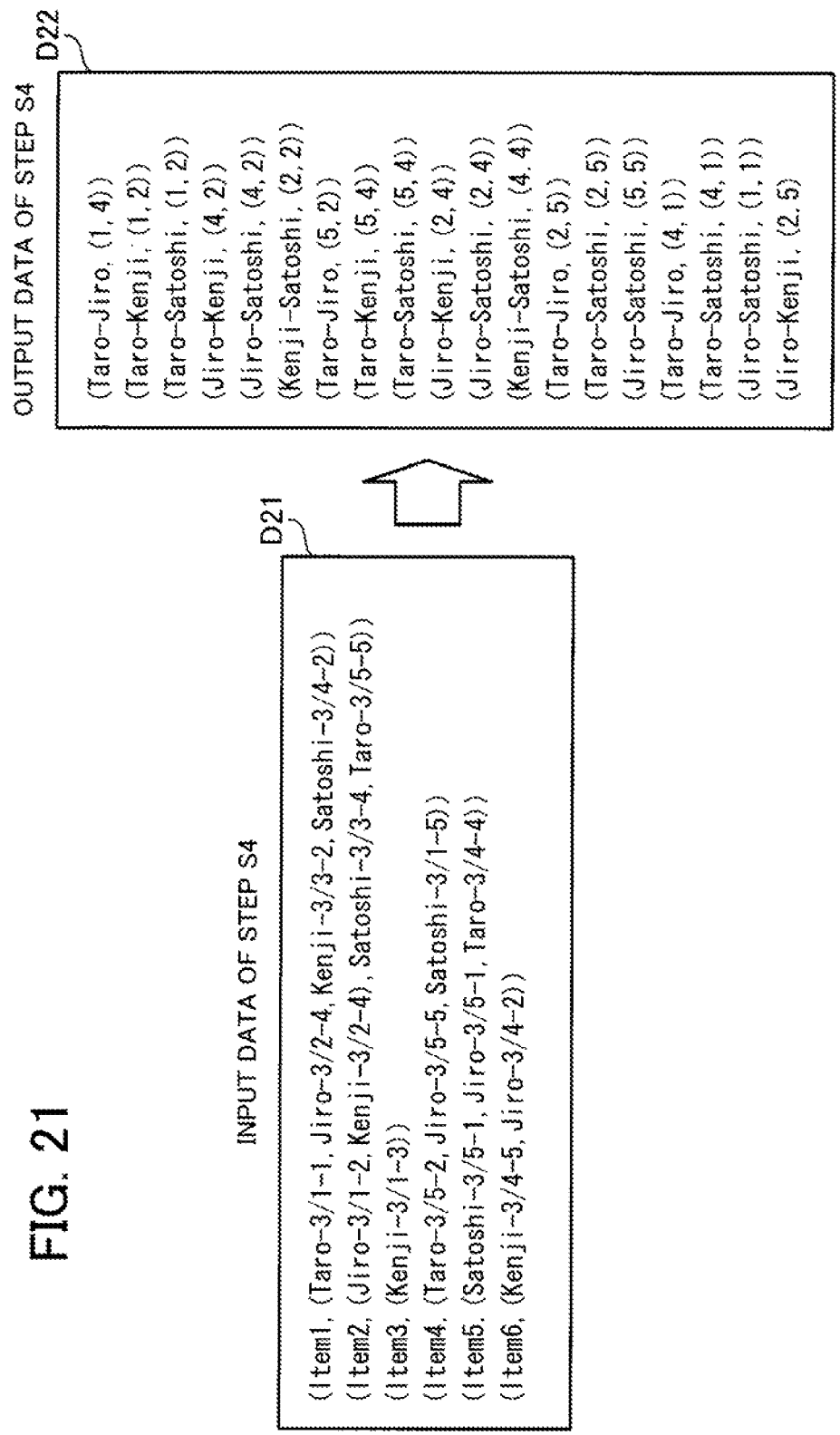
FIG. 21 illustrates an input and output example of second Map according to the third embodiment.

FIG. 21 illustrates an input and output example of second Map according to the third embodiment. Data 21 is output data of step S3a (identical with the data D14) and input data of step S4 (the second Map process). Data D22 is output data of step S4. The data D22 includes new key-value pairs generated based on the data D21. More specifically, the data D22 is obtained by extracting, as the keys, pairs of users who gave ratings from each row of the data D21 and designating the rating values individually given by the extracted users as the values. In the data D22, each key is denoted by paired user names connected with a "-" (hyphen) (for example, "Taro-Jiro"). In addition, each value is denoted by rating values of corresponding paired users, delimited by a comma "." (for example, "(1,4)").

Figure 22:
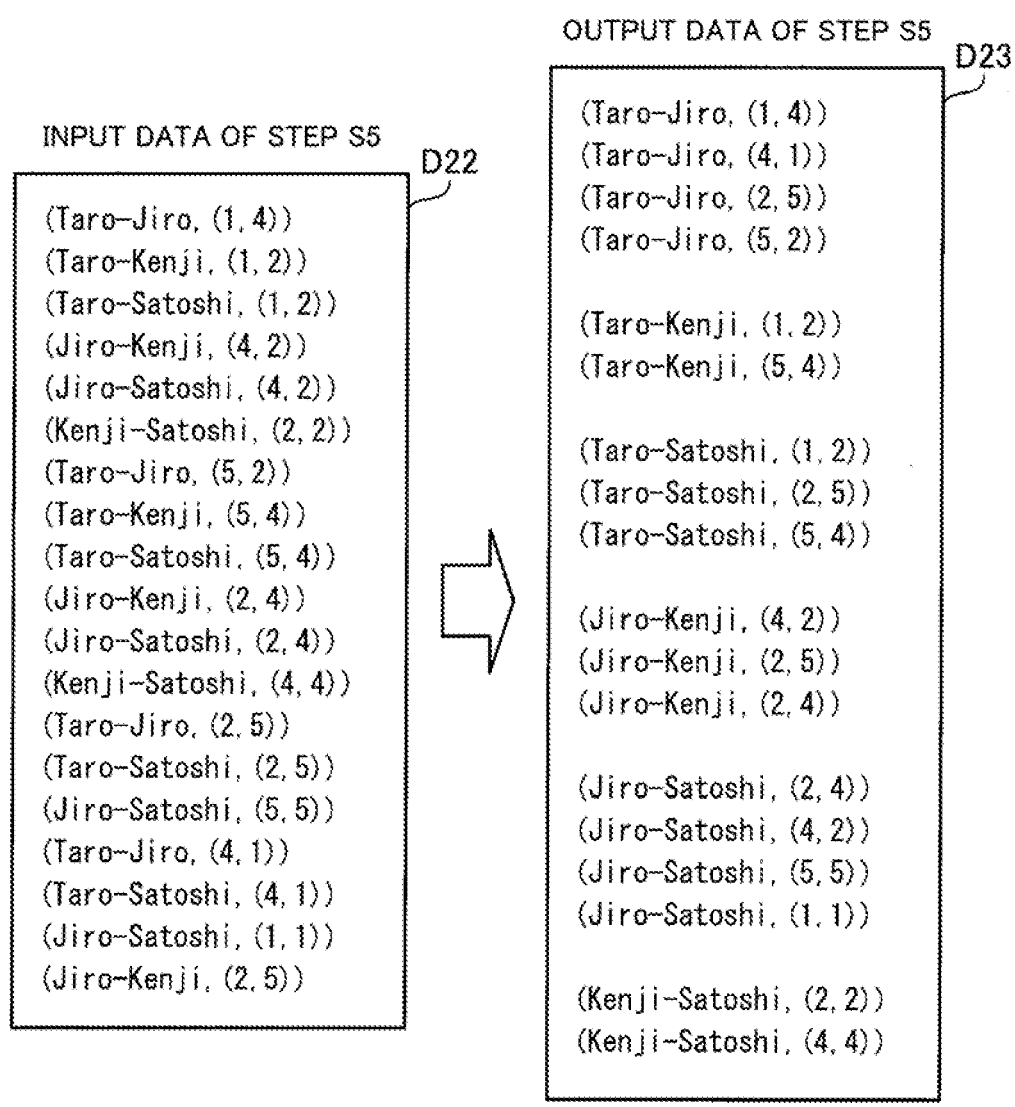
FIG. 22 illustrates an input and output example of second shuffle & sort according to the third embodiment.

FIG. 22 illustrates an input and output example of second shuffle & process according to the third embodiment. The data D22 is output data of step S4 and input data of step S5 (the second shuffle & sort process). Data D23 is output data of step S5. The data D23 is obtained by sorting the key-value pairs of the data D22 by the key (the pair of user names).

Figure 23:
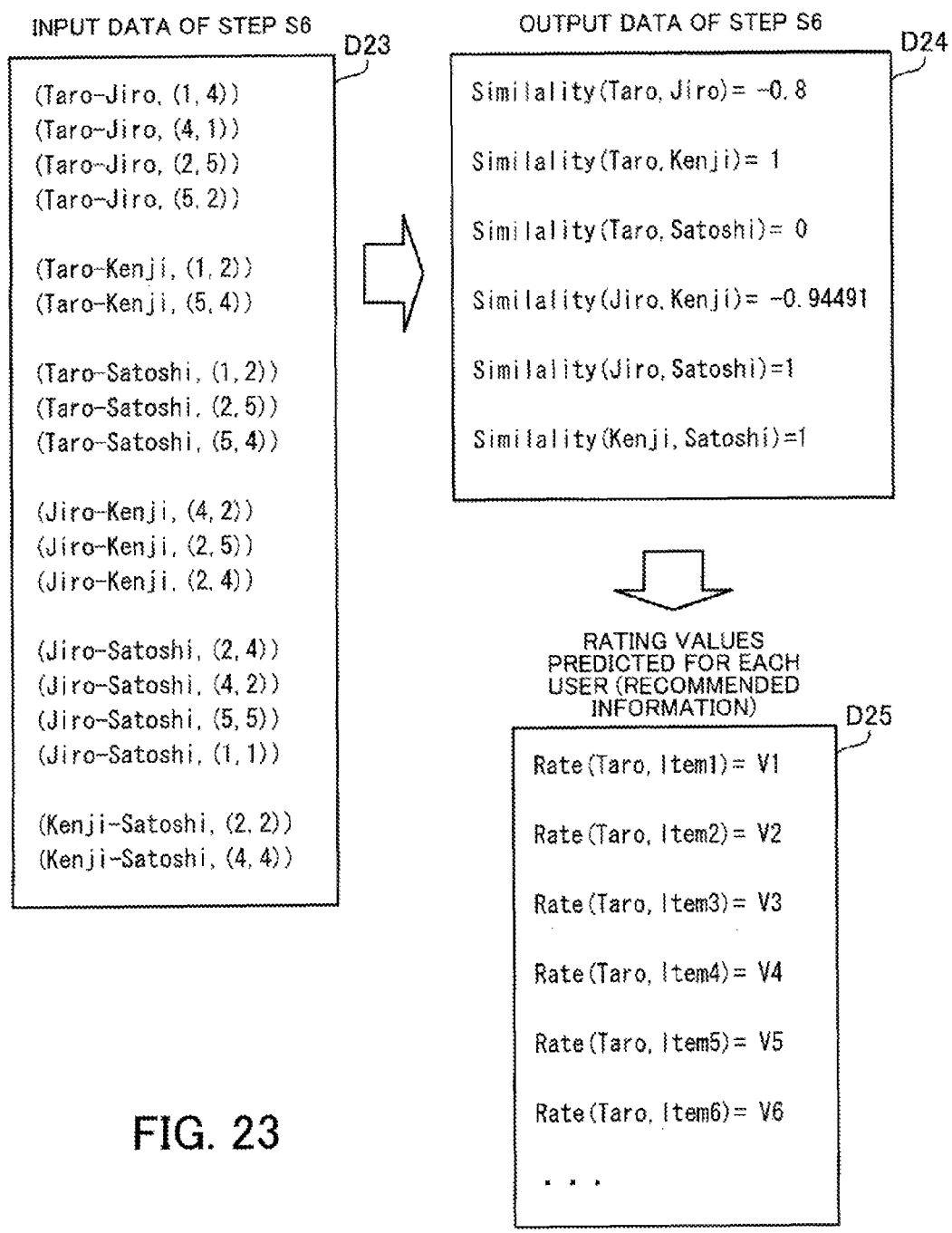
FIG. 23 illustrates an input and output example of second Reduce according to the third embodiment.

FIG. 23 illustrates an input and output example of second Reduce according to the third embodiment. The data D23 is output data of step S5 and input data of step S6 (the second Reduce process). Data D24 is output data of step S6 and is generated based on the data D23. Each row of the data D24 is the degree of similarity (correlation coefficient) between paired users, calculated by the expression (1) based on the data D23. Data D25 is a list made up of rating values predicted for individual users with respect to each product, calculated by the expression (2) using the degrees of similarity between paired users, and is recommended information used for extracting recommended products. For example, in the case of extracting three recommended products for the user "Taro", three rows of Rate(Taro,Item) are selected, from the data D25, in the order of decreasing predicted rating values to thereby identify appropriate products.

FIG. 24 illustrates an example of a Reduce result table according to the third embodiment. A Reduce result table 615 is stored in the result information storing unit 610. The Reduce result table 611 includes items of input data identifier and Reduce result. Information registered under each of the items is the same as that of the Reduce result table 611 of FIG. 8.

Using FIGS. 18 to 23, the method described above is for acquiring recommended information by performing the first and second phase MapReduce on the entire current input data. The distributed processing system of the third embodiment is capable of searching recommended information acquired in the past and using found information for acquiring recommended information for the current input data. The flow of the distributed processing according to the third embodiment is the same as that of the distributed processing of the second embodiment described in FIG. 9. In addition, the procedure of the analytical process according to the third embodiment is the same as that of the analytical process of the second embodiment described in FIG. 10. Further, the procedure of the assembly process according to the third embodiment is the same as that of the assembly process of the second embodiment described in FIG. 12.

Figure 25:
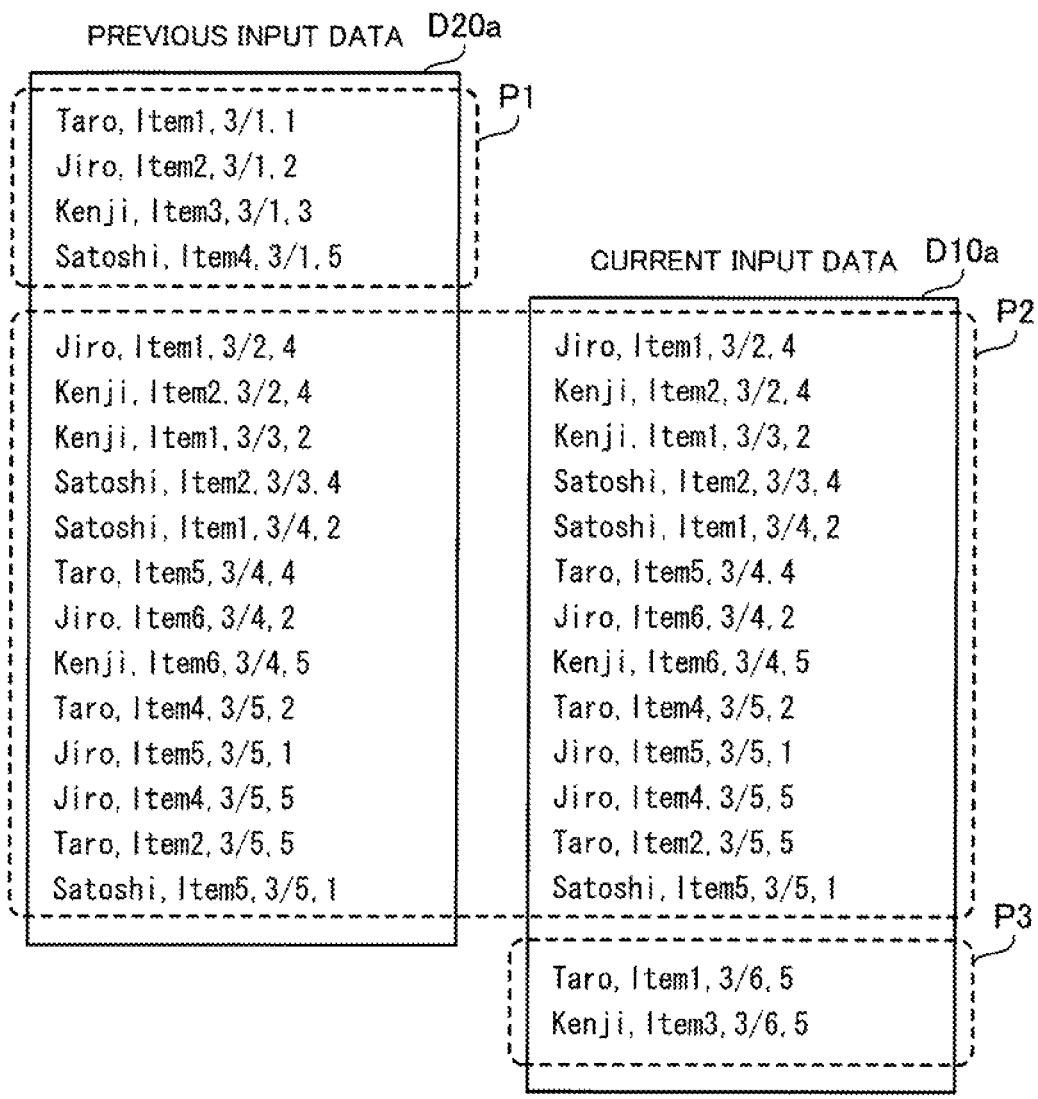
FIG. 25 illustrates an example of a result of an analytical process according to the third embodiment.

FIG. 25 illustrates an example of a result of an analytical process according to the third embodiment. In the example of FIG. 25, current input data D10a is a data set of rating values of March 2 to 6. Previous input data D20a is a data set of rating values of March 1 to 5. In this case, the input data P1 appearing only in the previous input data is rating value data of March 1. The overlapping input data P2 is rating value data of March 2 to 5. The input data P3 appearing only in the current input data is rating value data of March 6. The processing assembly unit 310 assembles a MapReduce job based on the analysis result. At this point, in the case of performing a MapReduce job on the entire input data, the procedure described in FIGS. 18 to 23 is established. On the other hand, for divided data as illustrated in FIG. 25, the processing assembly unit 310 establishes a procedure different from that described in FIGS. 18 to 23. Next described is a specific example of the procedure of the distributed processing, established by the process assembly unit 310.

Figure 26:
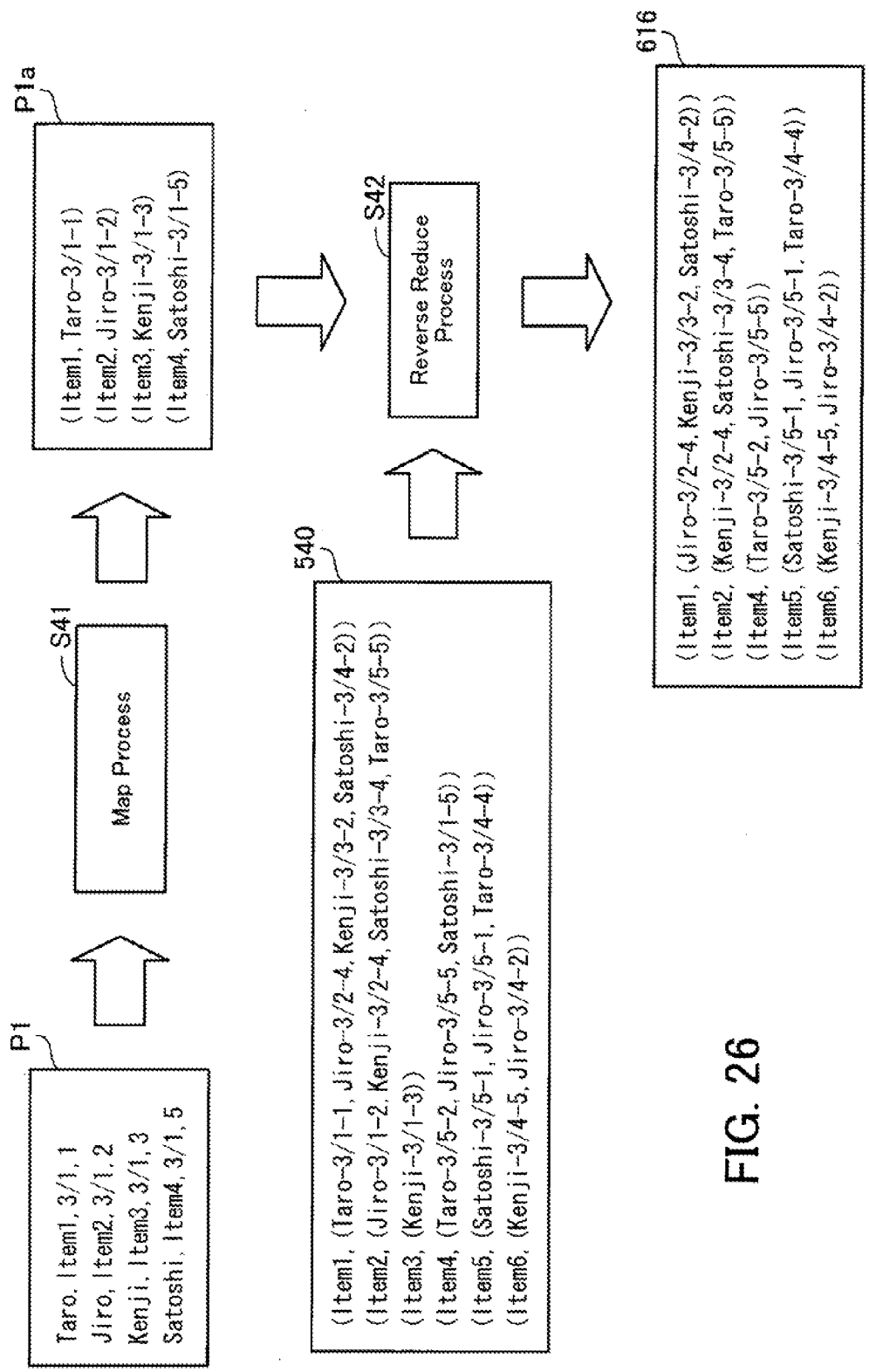
FIG. 26 illustrates an example of distributed processing according to the third embodiment.

FIG. 26 illustrates an example of distributed processing according to the third embodiment. The distributed processing of FIG. 26 is described next according to the step numbers.

(Step S41) The data processing units 710, 710a, . . . collectively execute a Map process on the input data P1 appearing only in the previous input data to thereby generate the Map result P1a. In this example, the input data is divided according to the date and, thus, one day is a Map task unit. Here, the input data P1 appearing only in the previous input data is the rating value data of March 1. Accordingly, in this case, the Map process of step S41 is assigned to, for example, one data processing unit. Note however that the rating value data of March 1 may be further divided and the Map process (i.e., Map tasks) may be, then, assigned to multiple data processing units. In this manner, the Map process is performed at a high speed.

(Step S42) The data processing units 710, 710a, . . . collectively execute a shuffle & sort process on the Map result P1a. The data processing units 710, 710a, . . . acquire the previous processing result from the result information storing unit 610, and collectively execute a reverse Reduce process using a result of the shuffle & sort process to thereby generate a reverse Reduce result 616. In this example, the previous processing result is a previous Reduce result 540 corresponding to previous input data 20a. For example, the Map result P1a includes key-value pairs <Item,Taro-3/1-1> and <Item2, Jiro-3/1-2>. The previous processing result (the previous Reduce result 540) includes key-value pairs <Item1, (Taro-3/1-1,Jiro-3/2-4, . . . )> and <Item2, (Jiro-3/1-2,Kenji-3/2-4, . . . )>. In this case, for example, the data processing unit 710 performs a reverse Reduce task on the key "Item1". More specifically, the data processing unit 710 removes "Taro-3/1-1" from the previous processing result <Item1, (Taro-3/1-1, Jiro-3/2-4, . . . )> to thereby generate a key-value pair <Item1, (Jiro-3/2-4, . . . )>. In addition, for example, the data processing unit 710a performs a reverse Reduce task on the key "Item2". More specifically, the data processing unit 710a removes "Jiro-3/1-2" from the previous processing result <Item2, (Jiro-3/1-2,Kenji-3/2-4, . . . )> to thereby generate a key-value pair <Item2, (Kenji-3/2-4, . . . )>. The reverse Reduce result 616 is equal to a Reduce result corresponding to the overlapping input data P2.

Figure 27:
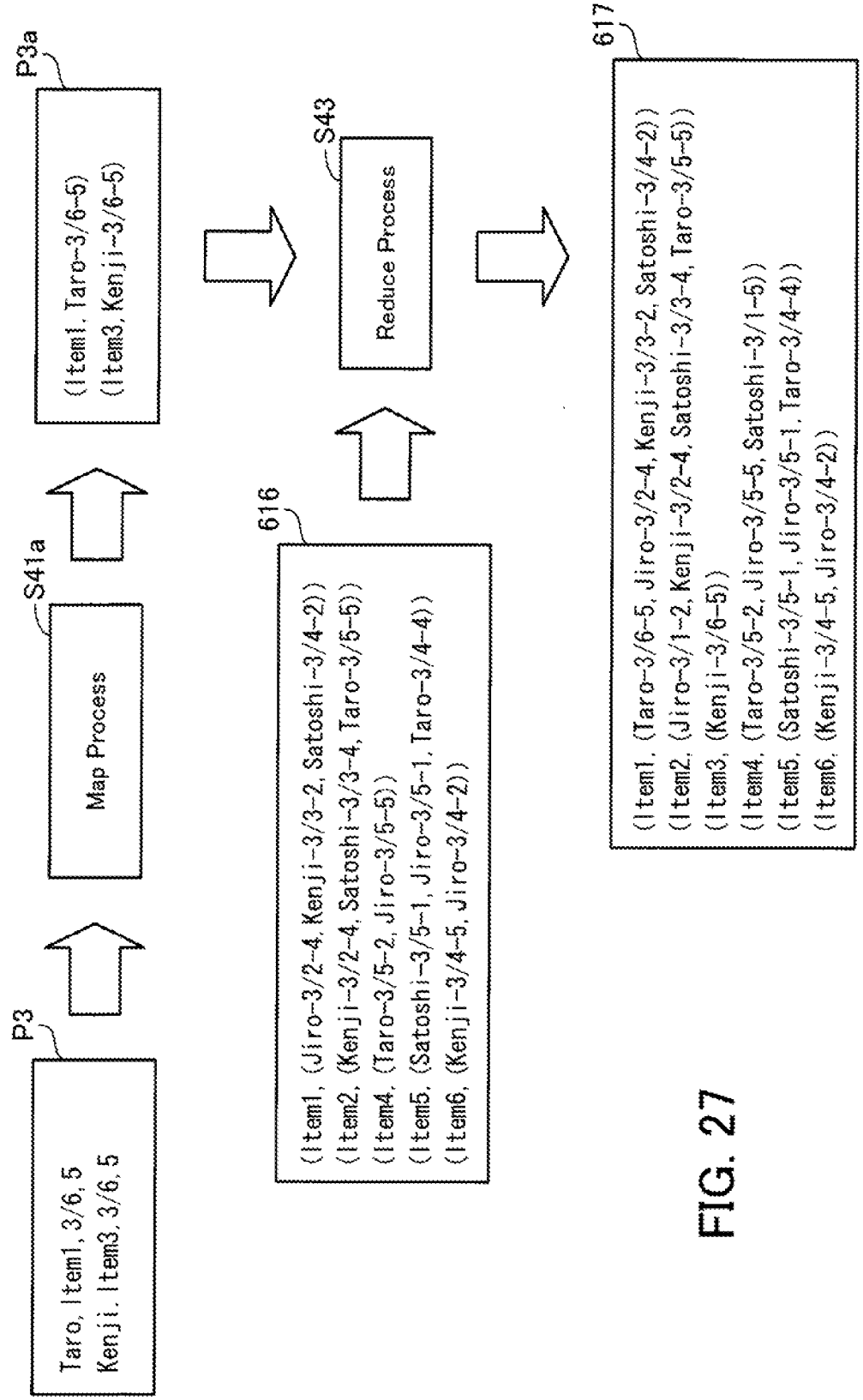
FIG. 27 illustrates the example of distributed processing according to the third embodiment, continued from FIG. 26.

FIG. 27 illustrates the example of the distributed processing according to the third embodiment, continued from FIG. 26. The distributed processing of FIG. 27 is described next according to the step numbers.

(Step S41a) The data processing units 710, 710a, . . . collectively execute a Map process on the input data P3 appearing only in the current input data to thereby generate the Map result P3a. Here, the input data P3 appearing only in the current input data is the rating value data of March 6. Accordingly, in this case, as in the Map process of step S41, the Map process may be assigned to one of the data processing units. Alternatively, the rating value data of March 6 is further divided and the Map process (i.e., Map tasks) may be, then, assigned to multiple data processing units. Note that steps S41 and S41a may be executed in parallel. For example, by executing step S41a using a data processing server other than the data processing server used in step S41, steps 41 and 41a are executed in parallel.

(Step S43) The data processing units 710, 710a, . . . collectively execute a shuffle & sort process on the Map result P3a. The data processing units 710, 710a, . . . collectively execute a Reduce process using the reverse Reduce result 616 and a result of the shuffle 6 sort process to thereby generate a Reduce result 617. For example, the reverse Reduce result 616 includes the key-value pair <Item1, (Jiro-3/2-4, . . . )>. The Map result P3a includes key-value pairs <Item1,Taro-3/6-5> and <Item3,Kenji-3/6-5>. In this case, for example, the data processing unit 710 performs a Reduce process on the key "Item1". More specifically, the data processing unit 710 adds <Item1,Taro-3/6-5> to the reverse Reduce result <Item1, (Jiro-3/2-4, . . . )> to thereby generate a key-value pair <Item1, (Taro-3/6-5,Jiro-3/2-4, . . . )>. In addition, for example, the data processing unit 710a performs a Reduce task on the key "Item3". More specifically, the data processing unit 710a newly generates a key-value pair <Item3, (Kenji-3/6-5)>.

In the above-described manner, the result of the MapReduce job for the current input data D10a is obtained using the previous input data D20a. Although, in the description above, steps 341 and S41a are executed in parallel, step S41a may be executed with step S42 in parallel. Alternatively, steps S41 and S41a may be executed in series. In the case of executing in series, the execution order of steps S41 and S41a may be arbitrarily determined. That is, step S41 may be executed first, or step S41a may be executed first.

FIG. 28 illustrates an example of a code for the reverse Reduce process according to the third embodiment. In the code of the reverse Reduce process of the third embodiment, in class CollaborativeFiltering_phase1_Reverse_Reduce, reduce method is defined. The reduce method is for deleting, from the previous processing result, data whose user name and date are the same as those set in the value of the key-value pair included in the Map result P1a. For example, in the case of step S42 of FIG. 26, "Taro-3/1-1" included in the key-value pair <Item1, (Taro-3/1-1,Jiro-3/2-4, . . . )> of the previous Reduce result 540 and "Taro-3/1-1" included in the key-value pair <Item1,Taro-3/1-1> of the Map result P1a include the same user name and date. Therefore, "Taro-3/1-1" is deleted from the key-value pair of the previous Reduce result 540. By defining the above-described operation, it is possible to perform the reverse Reduce process in the first phase.

FIG. 29 illustrates an example of a code for the Reduce process according to the third embodiment. In the code of the Reduce process of the third embodiment, in class CollaborativeFiltering_phase1_Reduce, reduce method is defined. The reduce method is for setting, in the reverse Reduce result 616, a user name and a date set in the value of a key-value pair included in the Map result P3a. For example, in the case of step S43 of FIG. 27, "Taro-3/6-5" included in the key-value pair <Item1,Taro-3/6-5> of the Map result P3a is added to the key-value pair <Item1, (Jiro-3/2-4, . . . )> of the reverse Reduce result 616. Note that if the key-value pair of the reverse Reduce result 616 includes information of the same user name with an older date, the information is deleted. By defining the above-described operation, it is possible to perform the Reduce process for adding the value of a key-value pair included in the Map result P3a to the key-value pair of the reverse Reduce result 616.

As described above, according to the distributed processing system of the third embodiment also, it is possible to improve the usability of past processing results using a reverse Reduce process.

Note that the description above illustrates the case of performing a reverse Reduce process in the first phase, however, a reverse Reduce process may also be used in a summing process of the second phase. For example, the expression (1) includes the calculation of the standard deviation. The standard deviation is the square root of the variance, and the variance is obtained by the following expression (3).

$$\sigma^2 = \frac{1}{n}\sum_{i=1}^{n}(x_i - \bar{x})^2 \quad (3)$$

$$= \frac{1}{n}\sum_{i=1}^{n}x_i^2 - \bar{x}^2$$

The expression (3) includes the mean square of each element $x_i$ (obtained by dividing the sum of squares of $x_i$ by the number of elements n) and the square of the average value of $x_i$ (obtained by dividing the sum of $x_i$ by the number of elements n). Here, a reverse Reduce process may be used for calculating the sum of squares of $x_i$ in the calculation of the mean square of $x_i$. In addition, a reverse Reduce process may be used for calculating the sum of $x_i$ in the calculation of the square of the average value of $x_i$.

(d) Fourth Embodiment

Next described is a fourth embodiment. The following description mainly focuses on differences from the above-described second and third embodiments while omitting repeated explanations. The distributed processing systems of the second and third embodiments are capable of improving usability of past processing results using a reverse Reduce process. However, the amount of calculation required when a reverse Reduce process is used may exceed the amount of calculation required when a reverse Reduce process is not used. In this case, it is preferable to execute processing without a reverse Reduce process. In view of this, the fourth embodiment provides a function of comparing the amount of calculation required when a reverse Reduce process is used and the amount of calculation required when a reverse Reduce process is not used and determining how to execute the main processing based on the comparison result.

The overall structure of a distributed processing system of the fourth embodiment is the same as that of the distributed processing system of the second embodiment described in FIG. 2. Individual servers included in the distributed processing system of the fourth embodiment are identified by the same names and reference numerals as those used in the second embodiment. An example of hardware and an example of software of each of the servers are individually the same as those of each server of the second embodiment, described in FIGS. 3 and 4, respectively. Components included in the individual servers of the fourth embodiment are identified by the same names and reference numerals as those of the second embodiment.

Figure 30:
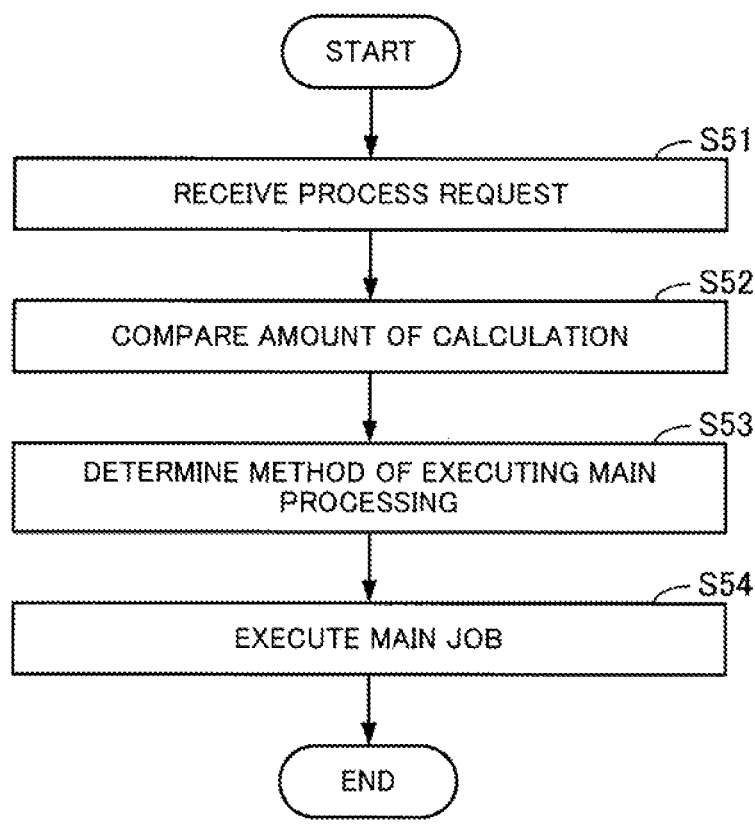
FIG. 30 is a flowchart illustrating an example of distributed processing according to a fourth embodiment.

FIG. 30 is a flowchart illustrating an example of distributed processing of the fourth embodiment. The distributed processing of FIG. 30 is described next according to the step numbers in the flowchart.

(Step S51) The execution control unit 110 receives a process request from the client 30.

(Step S52) The execution control unit 110 causes the analysis unit 210 to analyze the input data and, then, causes the process assembly unit 310 to perform an assembly process according to the analysis result. Assume here that, by the analysis, the input data P1 appearing only in the previous input data, the overlapping input data P2, and the input data P3 appearing only in the current input data are obtained. In this case, as a result of the assembly process, a MapReduce job using a reverse Reduce process is created. Subsequently, the execution control unit 110 compares the amount of calculation required when the reverse Reduce process is used and the amount of calculation required when the reverse Reduce process is not used. For example, the comparison may be achieved by comparing the number of records included in each set of data. More specifically, in the case where the number of records included in the input data P1 appearing only in the previous input data is more than or equal, to the number of records included in the overlapping input data P2, it is determined that the amount of calculation required when the reverse Reduce process is used exceeds the amount of calculation required when the reverse Reduce process is not used. On the other hand, in the case where the number of records included in the input data P1 appearing only in the previous input data is less than the number of records included in the overlapping input data P2, it is determined that the amount of calculation required when the reverse Reduce process is used falls below the amount of calculation required when the reverse Reduce process is not used.

(Step S53) The execution control unit 110 determines the method for the main MapReduce job. More specifically, if the amount of calculation required when the reverse Reduce process is used falls below the amount of calculation required when the reverse Reduce process is not used, it is determined to execute the MapReduce job using the reverse Reduce. On the other hand, if the amount of calculation required when the reverse Reduce process is used exceeds the amount of calculation required when the reverse Reduce process is not used, it is determined to execute the MapReduce job with respect to the entire current input data without the reverse Reduce process.

(Step S54) Based on the method determined in step S53, the execution control unit 110 assigns Map tasks and Reduce tasks (N.B. further assigns reverse Reduce tasks in the case of using the reverse Reduce process) to the data processing units 710, 710a, ... to thereby execute the MapReduce job.

In the above-described manner, the execution control unit 110 selects a method requiring a smaller amount of calculation. With this, it is possible to speed up the MapReduce job.

Note that in the determination of step S52, a MapReduce job may be executed on a trial basis using a predetermined proportion of the input data and then the processing time may be measured in order to determine whether the application of the reverse Reduce process enables speed-up of the data processing. More specifically, records are extracted in the same proportion from each of the input data P1 appearing only in the previous input data, the overlapping input data P2, and the input data P3 appearing only in the current input data. Then, the processing time (corresponding to the amount of calculation) of the MapReduce job is compared between when the reverse Reduce process is used and when the reverse Reduce process is not used. An entire processing time T1 required when the reverse Reduce process is used is represented, for example, by the following equation.

$T1$=Max(previous Map process time+previous reverse Reduce process time,current Map process time)+ current Reduce process time Here, the Max operator selects the largest element among elements in the parentheses. The previous Map process time is the time required for a Map process performed on the input data P1 appearing only in the previous input data. The previous reverse Reduce process time is the time required for a reverse Reduce process performed on the result of the previous Map process. The current Map process time is the time required for a Map process performed on the input data P3 appearing only in the current input data. The current Reduce process time is the time required for a Reduce process performed on the result of the current Map process. Note that, as the process times for the reverse Reduce process and the Reduce process are considered to be insignificant, these process times may be ignored. In this case, an entire process time T1a required when the reverse Reduce process is used may be expressed as: T1a=(previous Map process time, current Map process time).

An entire process time T2 required when the reverse Reduce process is not used is represented, for example, by the following equation.

T2=Max(overlapping Map process time,current Map process time)+Max(overlapping Reduce process time,current Reduce process time)

Here, the overlapping Map process time is the time required for a Map process performed on the overlapping input data P2. The overlapping Reduce process time is the time required for a Reduce process performed on the result of the Map process performed on the overlapping input data P2.

Then, in step S53, a method for the main MapReduce job is determined based on the magnitude relation of T1 (or T1a) and T2. More specifically, when T1 (or T1a) is less than T2, the MapReduce job is performed using the reverse Reduce process. If T1 (or T1a) is more than or equal to T2, the MapReduce job is performed without the reverse Reduce process. In the above-described manner, it is possible to compare the magnitude of the amount of calculation required when the reverse Reduce process is used and when the reverse Reduce process is not used.

Note that the functions of the data processing servers 700, 700a, . . . may be achieved by causing a computer to execute a predetermined program. The program may be recorded in a computer-readable portable recording medium. As the recording medium, various types of media may be used, as in the case of the recording medium 13. In order to distribute the program, for example, recording media in which the program is recorded are provided. Alternatively, the program may be stored in a server computer and then transferred to the data processing servers 700, 700a, . . . via a network. The data processing servers 700, 700a, . . . store the program, which is originally recorded in a recording medium or acquired via a network, for example, in their own non-volatile memory media. Subsequently, the data processing servers 700, 700a, . . . individually read the program from the non-volatile memory media. Note however that each of the data processing servers 700, 700a, . . . may sequentially load and execute the acquired program into a random access memory (RAM), instead of storing the program in non-volatile memory media.

According to one aspect, it is possible to improve reusability of past processing results.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A data processing method to be executed in a system for performing a first process on input data set using a plurality of nodes and performing a second process on a result of the first process, the data processing method comprising:
    searching, by a processor, a storage apparatus that stores one or more results of the second process, corresponding to input data sets processed in the past, for a result of the second process, corresponding to a second input data set having an overlapping part with a first input data set, when the first input data set is designated;
    acquiring, by the processor, a result of the first process using second differential input data that is included in the second input data set but not included in the first input data set;
    generating, by the processor, a result of the second process, corresponding to the second input data set except the second differential input data, by performing the second process on the result of the first process using the second differential input data for removing an effect of the second differential input data from the result of the second process, corresponding to the second input data set;
    acquiring, by the processor, a result of the first process using first differential input data that is included in the first input data set but not included in the second input data set; and
    generating, by the processor, a result of the second process, corresponding to the first input data set, by combining the result of the second process, corresponding to the second input data set except the second differential input data, and the result of the first process using the first differential input data.

2. The data processing method according to claim 1, wherein:
    when there are a plurality of input data sets processed in the past, each having an overlapping part with the first input data set, a result of the second process, corresponding to an input data set having a largest range of the overlapping part, is selected from among a plurality of results of the second process, corresponding to the plurality of input data sets.

3. The data processing method according to claim 1, wherein:
    a calculation amount according to a first generation method and a calculation amount according to a second generation method are estimated, the first generation method generating the result of the second process, corresponding to the first input data set, by applying the result of the first process using the second differential input data, to the result of the second process, corresponding to the second input data set, and the second generation method performing the first process and the second process on a whole of the first input data set; and
    when the calculation amount according to the first generation method is smaller than the calculation amount according to the second generation method, the result of the second process, corresponding to the first input data set, is generated according to the first generation method.

4. The data processing method according to claim 1, wherein:
    the effect of the second differential input data is removed by one of
        subtracting a value of the result of the first process using the second differential input data, from a value of the result of the second process, corresponding to the second input data set, and
        deleting a data element included in the result of the first process using the second differential input data, from a plurality of data elements included in the result of the second process, corresponding to the second input data set.

5. A distributed processing system for performing a first process on input data set using a plurality of nodes and performing a second process on a result of the first process, the distributed processing system comprising:
- a storage apparatus configured to store one or more results of the second process, corresponding to input data sets processed in the past;
- a first processor configured to search, when a first input data set is designated, the storage apparatus for a result of the second process, corresponding to a second input data set having an overlapping part with the first input data set; and
- a second processor configured to perform a procedure including:
  - acquiring a result of the first process using second differential input data that is included in the second input data set but not included in the first input data set;
  - generating a result of the second process, corresponding to the second input data set except the second differential input data, by performing the second process on the result of the first process using the second differential input data for removing an effect of the second differential input data from the result of the second process, corresponding to the second input data set;
  - acquiring a result of the first process using first differential input data that is included in the first input data set but not included in the second input data set; and
  - generating a result of the second process, corresponding to the first input data set, by combining the result of the second process, corresponding to the second input data set except the second differential input data, and the result of the first process using the first differential input data.

6. A non-transitory computer-readable storage medium storing a computer program for performing a second process on a result of a first process performed on input data set, using a plurality of nodes, the computer program causing a computer to perform a procedure comprising:
- searching a storage apparatus that stores one or more results of the second process, corresponding to input data sets processed in the past, for a result of the second process, corresponding to a second input data set having an overlapping part with a first input data set, when the first input data set is designated;
- acquiring a result of the first process using second differential input data that is included in the second input data set but not included in the first input data set;
- generating a result of the second process, corresponding to the second input data set except the second differential input data, by performing the second process on the result of the first process using the second differential input data for removing an effect of the differential input data from the result of the second process, corresponding to the second input data set;
- acquiring a result of the first process using first differential input data that is included in the first input data set but not included in the second input data set; and
- generating a result of the second process, corresponding to the first input data set, by combining the result of the second process, corresponding to the second input data set except the second differential input data, and the result of the first process using the first differential input data.

* * * * *